US012276559B2

(12) United States Patent
Chao et al.

(10) Patent No.: US 12,276,559 B2
(45) Date of Patent: Apr. 15, 2025

(54) ELECTRONIC TORQUE REALIZATION APPARATUS

(71) Applicant: Government of the United States of America, as represented by the Secretary of Commerce, Gaithersburg, MD (US)

(72) Inventors: Leon Shih Chao, Gaithersburg, MD (US); Stephan Schlamminger, Silver Spring, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 265 days.

(21) Appl. No.: 18/126,043

(22) Filed: Mar. 24, 2023

(65) Prior Publication Data

US 2023/0324239 A1    Oct. 12, 2023

Related U.S. Application Data

(60) Provisional application No. 63/323,685, filed on Mar. 25, 2022.

(51) Int. Cl.
*G01L 3/02* (2006.01)
*G01D 5/12* (2006.01)

(52) U.S. Cl.
CPC . *G01L 3/02* (2013.01); *G01D 5/12* (2013.01)

(58) Field of Classification Search
CPC ......... G01L 3/02; G01L 3/104; G01L 25/003; G01L 5/24; G01D 5/12
See application file for complete search history.

(56) References Cited

U.S. PATENT DOCUMENTS

| 3,519,095 | A | * | 7/1970 | Tomes | G01G 7/04 177/210 R |
| 7,690,273 | B2 | * | 4/2010 | Reber | G01G 23/10 73/862.69 |
| 11,187,571 | B2 | | 11/2021 | Chao et al. | |

OTHER PUBLICATIONS

Nishino, A., et al., "Development of a nano-torque generating machine using electromagnetic force based on the principle of the Kibble balance", Measurement, 2022, p. 111081, vol. 194.

(Continued)

*Primary Examiner* — Freddie Kirkland, III
(74) *Attorney, Agent, or Firm* — Office of Chief Counsel for National Institute of Standards and Technology

(57) ABSTRACT

Apparatus in accordance with embodiments of the present invention provide torque realization via electrical measurements traceable to the revised International Standard of Units (SI). Torque can be realized via a conversion of linear mechanism of a Kibble balance to a rotational mechanism. Embodiments of the present invention relates to an electronic torque realization apparatus including a rotor for holding permanent magnets and an encoder scale ring and for coupling to a torque device, a stator for characterizing physical aspects of a torque tool and for generating the torque on rotor in conjunction with the permanent magnets, a base plate for mounting a first end of rotor and stator, a cantilever for supporting a second end of rotor and for maintaining axial alignment, a bearing assembly for supporting the motion of rotor, and encoder for recording the angular position of rotor.

20 Claims, 10 Drawing Sheets

(56) References Cited

OTHER PUBLICATIONS

Kim, M.H., "Design of a New Dual-Mode Torque Standard Machine Using the Principle of the Kibble Balance", IEEE Transactions on Instrumentation And Measurement, 2021, p. 1005207, vol. 70.

Comden, Z., et al., "A new spin on Kibble: A self calibrating torque realization device at NIST", EUSPEN'S 22nd International Conference & Exhibition, 2022, p. 1-4.

Chao, et. al., "The Design of an Instrument to Realize Small Torque at NIST", 2020 NCSLI Conference Proceedings, 2020, p. 1-6.

Comden, et. al., "A New Spin On Kibble: First Measurements With A Self-Calibrating Torque Realization Device", 2021 ASPE Conference Proceedings, 2021, p. 1-5.

* cited by examiner (A)

(B)

(A)

(B)

ELECTRONIC TORQUE REALIZATION APPARATUS

CROSS-REFERENCE TO RELATED APPLICATION

This application claims the benefit of priority from U.S. Provisional Patent Application Ser. No. 63/323,685, filed on Mar. 25, 2022, the disclosure of which is incorporated herein by reference in its entirety.

STATEMENT REGARDING FEDERAL RIGHTS

The invention described herein was made with United States Government support from the National Institute of Standards and Technology (NIST), an agency of the United States Department of Commerce. The United States Government has certain rights in the invention.

FIELD OF THE INVENTION

The present invention relates generally to an apparatus for generating and measuring torque, and more particularly, to a self-calibrating system that can generate torque using a system of permanent magnets and electromagnetic coil.

BACKGROUND OF THE INVENTION

Mechanical assemblies, such as aircrafts, automobiles, cell phones and wrist watches, are held together using threaded fasteners whose optimal performance and reliability depend on accurate application of torque. For example, about six million components of a commercial aircraft are assembled using millions of threaded fasteners that are tightened to a specific torque using handheld tools, such as torque wrenches or torque screwdrivers.

These handheld tools are periodically calibrated by torque sensors, which typically have relative uncertainties of about 0.25%, and are traceable to torque transducers that are calibrated by deadweight torque machines. A lowest relative uncertainty for a deadweight torque machine currently available is about $2\times10^{-5}$. Existing traceability is simple, reliable, and convenient for the most part; however, at torques below 1 N m, the handling of small mass artifacts required to calibrate the deadweight machines is difficult, irreproducible, and burdensome.

Torque is expressed as a product of force and length in units of Newton-meter (Nm). A deadweight machine relies on a measured force generated by a calibrated mass in a known gravitational field applied to a well-characterized lever arm distance. According to a recent redefinition of the International System of Units (SI), mechanical force no longer needs to be traceable to a mass artifact and, instead, it can be realized through electromagnetic force, ultimately traceable to quantum standards. More particularly, torque no longer needs to be traceable to a calibrated weight suspended from a known lever arm. Specifically, a modification of the Kibble principle used for realizing the kilogram allows for direct realization of torque via electrical measurements traceable to the revised SI. Direct realization of torque is desirable for torque values lower than 0.01 N m since the process of balancing small mass artifacts required to calibrate fragile transducers is time consuming and irreproducible. Accordingly, there is a need for an apparatus that realizes torque via electrical standards without the use of traditional masses and levers. There is also a need for a tabletop size self-calibrating electromechanical system that can re-route the SI standards dissemination chain from mechanical standards to electrical standards and realize small torques with a relative uncertainty of about 0.1%.

SUMMARY OF THE INVENTION

Embodiments of the present invention relate to an apparatus that realizes torque via electrical standards without the use of traditional masses and levers. One embodiment of the present invention comprises a set of two spinning permanent magnets interacting with one stationary electromagnet via electromagnetic force, to determine the magnetic flux density of the permanent magnets as well as the physical characteristics of the electromagnet, thereby allowing for generation of high accuracy torques comparable to commercial standards. Embodiments of the subject invention may also include a single spinning permanent magnet interacting with two or more stationary electromagnets, or one or more stationary permanent magnets interacting with one or more spinning electromagnets.

Accordingly, embodiments of the present invention relates to an apparatus for electronic torque realization of a torque tool, including a rotor for coupling to the torque tool, wherein the rotor incudes a top ring magnet assembly comprising a first ring magnet and a second ring magnet, wherein each of the first and the second ring magnets comprises a plurality of segments coupled to form the first and the second ring magnets, wherein alternate segments of the plurality of the segments coupled to form each of the first and the second ring magnets are positioned upside-down, wherein the first ring magnet is coupled to the second ring magnet along a plane perpendicular to axes of the first and the second ring magnets, wherein the first ring magnet coupled to the second ring magnet is oriented to position the at least one upside-down segment of the plurality of segments of the first ring magnet above an unturned segment of the second ring magnet, wherein the first and the second ring magnets are oriented with a polarization in the axial direction; a bottom ring magnet assembly comprising a third ring magnet and a fourth ring magnet, wherein each of the third and the fourth ring magnets comprises a plurality of segments coupled to form the third and the fourth ring magnets, wherein alternate segments of the plurality of the segments coupled to form each of the third and the fourth ring magnets are positioned upside-down, wherein the third ring magnet is coupled to the fourth ring magnet along a plane perpendicular to axes of the third and the fourth ring magnets, wherein the third ring magnet coupled to the fourth ring magnet is oriented to position the at least one upside-down segment of the plurality of segments of the third ring magnet above an unturned segment of the fourth ring magnet, wherein the third and the fourth ring magnets are oriented with a polarization in the axial direction, wherein the bottom ring magnet assembly is positioned below the top ring magnet assembly and spaced apart from the top ring magnet by a gap; a rotor shaft extending through axial bores of the top and the bottom ring magnet assemblies, wherein the rotor shaft is mounted for rotational movement with the top and the bottom ring magnet assemblies; a top rotor flange extending radially from the rotor shaft for receiving the top ring magnet assembly, wherein a circumferential edge of the top rotor flange receives the axial bore of the top ring magnet assembly; a bottom rotor flange extending from the rotor shaft for receiving the bottom ring magnet assembly, wherein a circumferential edge of the bottom rotor flange receives the axial bore of the bottom ring magnet assembly, wherein the top rotor flange and the bottom rotor flange are positioned on the rotor shaft to provide the gap between the top and the bottom ring magnet assemblies; a top yoke fastened to the top rotor flange, wherein the top yoke comprises an axial bore for receiving the rotor shaft, wherein the top yoke extends radially from the rotor shaft to a circumferential edge of the top ring magnet assembly to form a first mounting surface, wherein the top ring magnet is mounted on the first mounting surface formed by the top yoke, wherein rotating the rotor shaft rotates the top yoke fastened to the top rotor flange; a bottom yoke fastened to the bottom rotor flange, wherein the bottom yoke comprises an axial bore for receiving the rotor shaft, wherein the bottom yoke extends radially from the rotor shaft to a circumferential edge of the bottom ring magnet assembly to form a second mounting surface, wherein the bottom ring magnet is mounted on the second mounting surface formed by the bottom yoke, wherein rotating the rotor shaft rotates the bottom yoke fastened to the bottom rotor flange; an encoder scale ring mounted on the rotor shaft, wherein the encoder scale provides a reference scale for determining an angular position of the rotor; a stator positioned in the gap between the top and the bottom ring magnet assemblies, wherein the stator generates a first magnetic field that interacts with a second magnetic field of the top and the bottom ring magnet assemblies, wherein the interaction of the first magnetic field generated by the stator with the second magnetic field of the top and the bottom ring magnet assemblies generates a torque on the rotor shaft; a base plate for mounting a first end of the rotor shaft and the stator; a cantilever for mounting a second end of the rotor shaft; a bearing assembly positioned on the rotor shaft to provide axial alignment to the rotor shaft extending from the base plate through the axial bores of the top and the bottom ring magnets to the cantilever; and an encoder positioned on the base plate and adjacent to the encoder scale for recording the angular position of the rotor. More particularly, each of the top and the bottom ring magnet assemblies has a diameter of about 4 cm. In one embodiment of the present invention, the gap between the top ring magnet assembly and the bottom ring magnet assembly is about 13 mm.

In one aspect of the present invention, each of the plurality of segments coupled to form the first, the second, the third and the fourth ring magnets is a half-ring permanent magnet. In another aspect of the present invention, each of the plurality of segments coupled to form the first, the second, the third and the fourth ring magnets is a quarter-ring permanent magnet.

In some aspects of the present invention, the bottom yoke further comprises a tapered ring to form a third mounting surface, and wherein mounting the encoder scale ring on the rotor shaft comprises mounting the encoder scale ring on the third mounting surface formed by the bottom yoke.

In some embodiments of the present invention, the top and the bottom yokes are made from a ferromagnetic material selected from the group comprising cobalt, iron, nickel, gadolinium, dysprosium, terbium, chromium oxide, europium oxide, a manganese/bismuth combination, a manganese/antimony combination, and a manganese/arsenic combination.

In one embodiment of the present invention, each of the top and the bottom yokes further comprises a plurality of bores positioned on its surface to align with a plurality of threaded bores on the top and the bottom rotor flanges, wherein each of the plurality of bores positioned on the top yoke receives a fastener for coupling with at least one of the plurality of the threaded bores of the top rotor flange, and wherein each of the plurality of bores positioned on the bottom yoke receives a fastener for coupling with at least one of the plurality of the threaded bores of the bottom rotor flange. In another embodiment of the present invention, the bottom yoke further comprises a plurality of threaded bores positioned on its surface to align with a plurality of bores in the encoder scale ring for receiving fasteners to attach the encoder scale ring to the bottom yoke.

In some embodiments of the present invention, the bearing assembly incudes a top radial bearing mounted at a first end of the rotor shaft, wherein outer diameter of the top radial bearing is substantially equal to diameter of a mounting bore in the cantilever positioned to receive the top radial bearing; and a bottom radial bearing mounted at a second end of rotor shaft, wherein outer diameter of the bottom radial bearing is substantially equal to the diameter of a mounting bore in the base plate positioned to receive the bottom radial bearing. In other embodiments of the present invention, the bearing assembly comprises an air bearing positioned below the bottom yoke on the rotor shaft.

In one aspect of the present invention, the stator includes a plurality of printed circuit boards configured to form a multi-layered printed circuit board; an electromagnetic coil fabricated on each side of each of the plurality of printed circuit boards with a predetermined number of windings; and a plurality of standoffs mounted on the base to support the multi-layered printed circuit board, wherein the plurality of standoffs supporting the multi-layered printed circuit board position the electromagnetic coil in the gap between the top and the bottom ring magnet assemblies. In one embodiment, the electromagnet coil fabricated on each of the printed circuit board is a D-shaped electromagnetic coil, and wherein at least a portion of the D-shaped electromagnetic coil is overlapped by at least a portion of each of the top and the bottom ring magnet assemblies. More particularly, the D-shaped electromagnet coil fabricated on each side of each of the plurality of the printed circuit board comprises 33 windings, and wherein the multi-layered printed circuit board comprises eight layers of the printed circuit boards.

In another aspect of the present invention, the stator includes a plurality of printed circuit boards configured to form a multi-layered printed circuit board; an electromagnetic coil comprising a plurality of segments of coils arranged to form a circular shape, wherein the electromagnetic coil is fabricated on each side of each of the plurality of printed circuit boards forming the multi-layered printed circuit board, wherein at least a portion of the electromagnetic coil is overlapped by at least a portion of each of the top and the bottom ring magnet assemblies; and a plurality of standoffs mounted on the base to support the multi-layered printed circuit board, wherein the plurality of standoffs supporting the multi-layered printed circuit board position the electromagnetic coil in the gap between the top and the bottom ring magnet assemblies.

Another embodiment of the present invention relates to an apparatus for electronic torque realization of a torque tool, including a rotor for coupling to the torque tool, wherein the rotor incudes a top ring magnet assembly comprising a first ring magnet and a second ring magnet, wherein each of the first and the second ring magnets comprises a plurality of half-ring permanent magnets coupled to form the first and the second ring magnets, wherein alternate half-ring permanent magnets of the plurality of the half-ring permanent magnets coupled to form each of the first and the second ring magnets are positioned upside-down, wherein the first ring magnet is coupled to the second ring magnet along a plane perpendicular to axes of the first and the second ring magnets, wherein the first ring magnet coupled to the second ring magnet is oriented to position the at least one upside-down half-ring permanent magnet of the plurality of half-ring permanent magnets of the first ring magnet above an unturned half-ring permanent magnet of the second ring magnet, wherein the first and the second ring magnets are oriented with a polarization in the axial direction; a bottom ring magnet assembly comprising a third ring magnet and a fourth ring magnet, wherein each of the third and the fourth ring magnets comprises a plurality of half-ring permanent magnets coupled to form the third and the fourth ring magnets, wherein alternate half-ring permanent magnets of the plurality of the half-ring permanent magnets coupled to form each of the third and the fourth ring magnets are positioned upside-down, wherein the third ring magnet is coupled to the fourth ring magnet along a plane perpendicular to axes of the third and the fourth ring magnets, wherein the third ring magnet coupled to the fourth ring magnet is oriented to position the at least one upside-down half-ring permanent magnet of the plurality of half-ring permanent magnets of the third ring magnet above an unturned half-ring permanent magnet of the fourth ring magnet, wherein the third and the fourth ring magnets are oriented with a polarization in the axial direction, wherein the bottom ring magnet assembly is positioned below the top ring magnet assembly and spaced apart from the top ring magnet by a gap; a rotor shaft extending through axial bores of the top and the bottom ring magnet assemblies, wherein the rotor shaft is mounted for rotational movement with the top and the bottom ring magnet assemblies; a top rotor flange extending radially from the rotor shaft for receiving the top ring magnet assembly, wherein a circumferential edge of the top rotor flange receives the axial bore of the top ring magnet assembly; a bottom rotor flange extending from the rotor shaft for receiving the bottom ring magnet assembly, wherein a circumferential edge of the bottom rotor flange receives the axial bore of the bottom ring magnet assembly, wherein the top rotor flange and the bottom rotor flange are positioned on the rotor shaft to provide the gap between the top and the bottom ring magnet assemblies; a top yoke fastened to the top rotor flange, wherein the top yoke comprises an axial bore for receiving the rotor shaft, wherein the top yoke extends radially from the rotor shaft to a circumferential edge of the top ring magnet assembly to form a first mounting surface, wherein the top ring magnet is mounted on the first mounting surface formed by the top yoke, wherein rotating the rotor shaft rotates the top yoke fastened to the top rotor flange; a bottom yoke fastened to the bottom rotor flange, wherein the bottom yoke comprises an axial bore for receiving the rotor shaft, wherein the bottom yoke extends radially from the rotor shaft to a circumferential edge of the bottom ring magnet assembly to form a second mounting surface, wherein the bottom ring magnet is mounted on the second mounting surface formed by the bottom yoke, wherein the bottom yoke further comprises a tapered ring to form a third mounting surface, wherein rotating the rotor shaft rotates the bottom yoke fastened to the bottom rotor flange; an encoder scale ring mounted on the third mounting surface formed by the bottom yoke, wherein the encoder scale provides a reference scale for determining an angular position of the rotor; a stator comprising a D-shaped electromagnetic coil fabricated on each side of each of a plurality of printed circuit boards with a predetermined number of windings, wherein the stator is positioned in the gap between the top and the bottom ring magnet assemblies, wherein at least a portion of the D-shaped electromagnetic coil is overlapped by at least a portion of each of the top and the bottom ring magnet assemblies, wherein the stator generates a first magnetic field that interacts with a second magnetic field of the top and the bottom ring magnet assemblies, wherein the interaction of the first magnetic field generated by the stator with the second magnetic field of the top and the bottom ring magnet assemblies generates a torque on the rotor shaft; a base plate for mounting a first end of the rotor shaft and the stator; a cantilever for mounting a second end of the rotor shaft; a top radial bearing mounted at a first end of the rotor shaft, wherein outer diameter of the top radial bearing is substantially equal to diameter of a mounting bore in the cantilever positioned to receive the top radial bearing; a bottom radial bearing mounted at a second end of rotor shaft, wherein the outer diameter of the bottom radial bearing is substantially equal to diameter of a mounting bore in the base plate positioned to receive the bottom radial bearing, wherein the top and the bottom radial bearings provide axial alignment to the rotor shaft extending from the base plate through the axial bores of the top and the bottom ring magnets to the cantilever; and an encoder positioned on the base plate and adjacent to the encoder scale for recording the angular position of the rotor.

Embodiments of the present invention also relate to an apparatus for electronic torque realization of a torque tool, including a rotor for coupling to the torque tool, wherein the rotor incudes a top ring magnet assembly comprising a first ring magnet and a second ring magnet, wherein each of the first and the second ring magnets comprises a plurality of quarter-ring permanent magnets coupled to form the first and the second ring magnets, wherein alternate quarter-ring permanent magnets of the plurality of the quarter-ring permanent magnets coupled to form each of the first and the second ring magnets are positioned upside-down, wherein the first ring magnet is coupled to the second ring magnet along a plane perpendicular to axes of the first and the second ring magnets, wherein the first ring magnet coupled to the second ring magnet is oriented to position the at least one upside-down quarter-ring permanent magnet of the plurality of quarter-ring permanent magnets of the first ring magnet above an unturned quarter-ring permanent magnet of the second ring magnet, wherein the first and the second ring magnets are oriented with a polarization in the axial direction; a bottom ring magnet assembly comprising a third ring magnet and a fourth ring magnet, wherein each of the third and the fourth ring magnets comprises a plurality of quarter-ring permanent magnets coupled to form the third and the fourth ring magnets, wherein alternate quarter-ring permanent magnets of the plurality of the quarter-ring permanent magnets coupled to form each of the third and the fourth ring magnets are positioned upside-down, wherein the third ring magnet is coupled to the fourth ring magnet along a plane perpendicular to axes of the third and the fourth ring magnets, wherein the third ring magnet coupled to the fourth ring magnet is oriented to position the at least one upside-down quarter-ring permanent magnet of the plurality of quarter-ring permanent magnets of the third ring magnet above an unturned quarter-ring permanent magnet of the fourth ring magnet, wherein the third and the fourth ring magnets are oriented with a polarization in the axial direction, wherein the bottom ring magnet assembly is positioned below the top ring magnet assembly and spaced apart from the top ring magnet by a gap; a rotor shaft extending through axial bores of the top and the bottom ring magnet assemblies, wherein the rotor shaft is mounted for rotational movement with the top and the bottom ring magnet assemblies; a top rotor flange extending radially from the rotor shaft for receiving the top ring magnet assembly, wherein a circumferential edge of the top rotor flange receives the axial bore of the top ring magnet assembly; a bottom rotor flange extending from the rotor shaft for receiving the bottom ring magnet assembly, wherein a circumferential edge of the bottom rotor flange receives the axial bore of the bottom ring magnet assembly, wherein the top rotor flange and the bottom rotor flange are positioned on the rotor shaft to provide the gap between the top and the bottom ring magnet assemblies; a top yoke fastened to the top rotor flange, wherein the top yoke comprises an axial bore for receiving the rotor shaft, wherein the top yoke extends radially from the rotor shaft to a circumferential edge of the top ring magnet assembly to form a first mounting surface, wherein the top ring magnet is mounted on the first mounting surface formed by the top yoke, wherein rotating the rotor shaft rotates the top yoke fastened to the top rotor flange; a bottom yoke fastened to the bottom rotor flange, wherein the bottom yoke comprises an axial bore for receiving the rotor shaft, wherein the bottom yoke extends radially from the rotor shaft to a circumferential edge of the bottom ring magnet assembly to form a second mounting surface, wherein the bottom ring magnet is mounted on the second mounting surface formed by the bottom yoke, wherein rotating the rotor shaft rotates the bottom yoke fastened to the bottom rotor flange; an encoder scale ring mounted on the rotor shaft, wherein the encoder scale provides a reference scale for determining an angular position of the rotor; a stator comprising a plurality of segments of coils fabricated on each side of each of a plurality of printed circuit boards, wherein the plurality of segments of coils is arranged to form a circular shape, wherein the stator is positioned in the gap between the top and the bottom ring magnet assemblies, wherein at least a portion of the plurality of segments of coils is overlapped by at least a portion of each of the top and the bottom ring magnet assemblies, wherein the stator generates a first magnetic field that interacts with a second magnetic field of the top and the bottom ring magnet assemblies, wherein the interaction of the first magnetic field generated by the stator with the second magnetic field of the top and the bottom ring magnet assemblies generates a torque on the rotor shaft; a base plate for mounting a first end of the rotor shaft and the stator; a cantilever for mounting a second end of the rotor shaft; a bearing assembly positioned on the rotor shaft to provide axial alignment to the rotor shaft extending from the base plate through the axial bores of the top and the bottom ring magnets to the cantilever; and an encoder positioned on the base plate and adjacent to the encoder scale for recording the angular position of the rotor.

DETAILED DESCRIPTION

Figure 1:
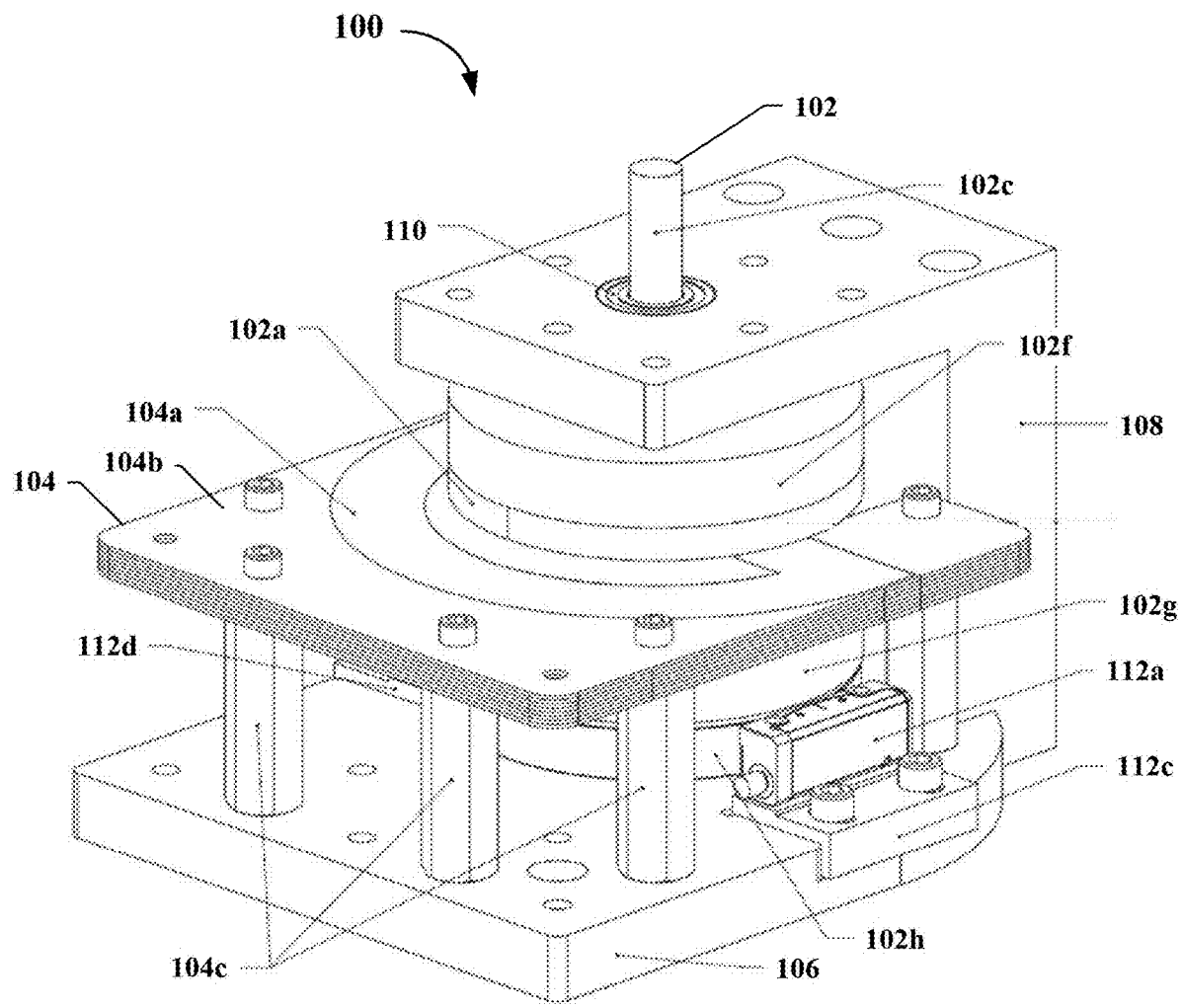
FIG. 1 illustrates an electronic torque realization apparatus in accordance with an embodiment of the present invention.

Apparatus in accordance with embodiments of the present invention provide torque realization via electrical measurements traceable to the revised International Standard of Units (SI). Torque can be realized via a conversion of linear mechanism of a Kibble balance to a rotational mechanism. A Kibble balance is an electromechanical apparatus that measures the weight of a test object by determining the electric current and voltage needed to produce a compensating force. An electromechanical apparatus can convert between mechanical energy and electrical energy through magnetic interaction. From a mechanical point of view, an electromechanical apparatus includes a stator which is a stationary part, and a rotor which is a rotating part. The following descriptions use the terms rotor and stator in describing a torque realization apparatus in accordance with embodiments of the present invention.

In the linear mechanism of a Kibble balance, a coil is translated vertically through a fixed magnet system. In the rotational mechanism of a Kibble balance, a rotor (a magnet system) spins relative to an adjacent stator (a coil) having a predetermined shape with two modes of operation: spin mode (Equation (1)) and torque mode (Equation (2)).

$$V = BLr\omega \quad (1)$$

$$\tau = BLrI \quad (2)$$

where V is the induced voltage in the coil caused by a rotation of the rotor (coil) relative to the stator (magnet), B is the magnetic flux density of the magnetic circuit at the coil, L is the total length of the radial wire segments of the coil, r is the distance between the axis of rotation and the center of each wire segment, $\omega = d\phi/dt$ is the relative angular velocity, τ is the torque acting between rotor and stator, and I is the electrical current. V, τ, B, and ω are all functions of the angle φ of the rotating armature, either the magnet system or the coil, ranging from 0 degrees to 360 degrees and B (φ)=B (φ)Lr. Accordingly, equations (1) and (2) could be simplified to the following.

$$V(\phi) = \beta(\phi)\omega(\phi) \quad (3)$$

$$\tau(\phi) = \beta(\phi)I \quad (4)$$

In spin mode, V(φ) is measured repeatedly as the rotating magnet spins continuously at φ allowing for a calibration factor, β(φ), to be calculated for a large number of φ values. In torque mode, the rotor (magnet system or coil) is controlled to a desired angle $\phi_1$ by injecting a current I into the coil. The torque $\tau(\phi_1)$ can then be calculated by multiplying the current I with the $\beta(\phi)$ determined from spin mode, or from the following:

$$\tau(\phi_1) = \frac{IV(\phi_1)}{\omega(\phi_1)} \quad (5)$$

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention. Reference will now be made to the drawings wherein like numerals refer to like elements throughout.

Figure 2:
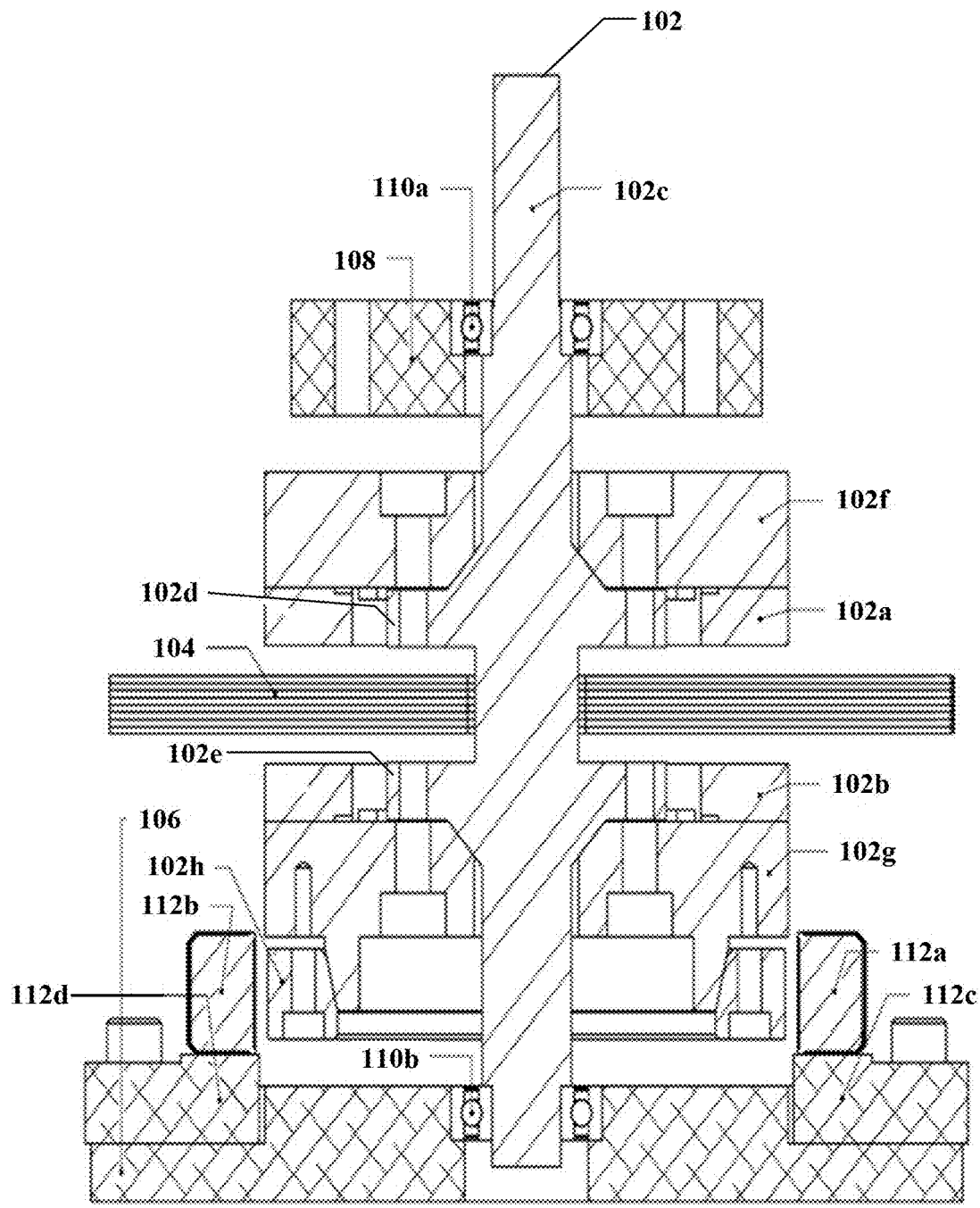
FIG. 2 illustrates an alternative perspective of an electronic torque realization apparatus in accordance with an embodiment of the present invention.

Referring now to the drawings, and more particularly, to FIGS. 1 and 2, there is shown an electronic torque realization apparatus, generally designated 100 and schematically showing an embodiment of the present invention, for realization of torque using electrical measurements traceable to the revised SI. Electronic torque realization apparatus 100 includes a rotor 102 for holding permanent magnets and an encoder scale ring and an interface for coupling to a hand-held torque tool or a device under test (DUT), a stator 104 for characterizing physical aspects of the device and for generating the torque on rotor 102 in conjunction with the permanent magnets, a base plate 106 for mounting a first end of rotor 102 and stator 104, a cantilever 108 for supporting a second end of rotor 102 and for maintaining axial alignment, bearing assembly 110 for supporting the motion of rotor 102, and encoder 112 for recording the angular position of rotor 102.

Figure 3:
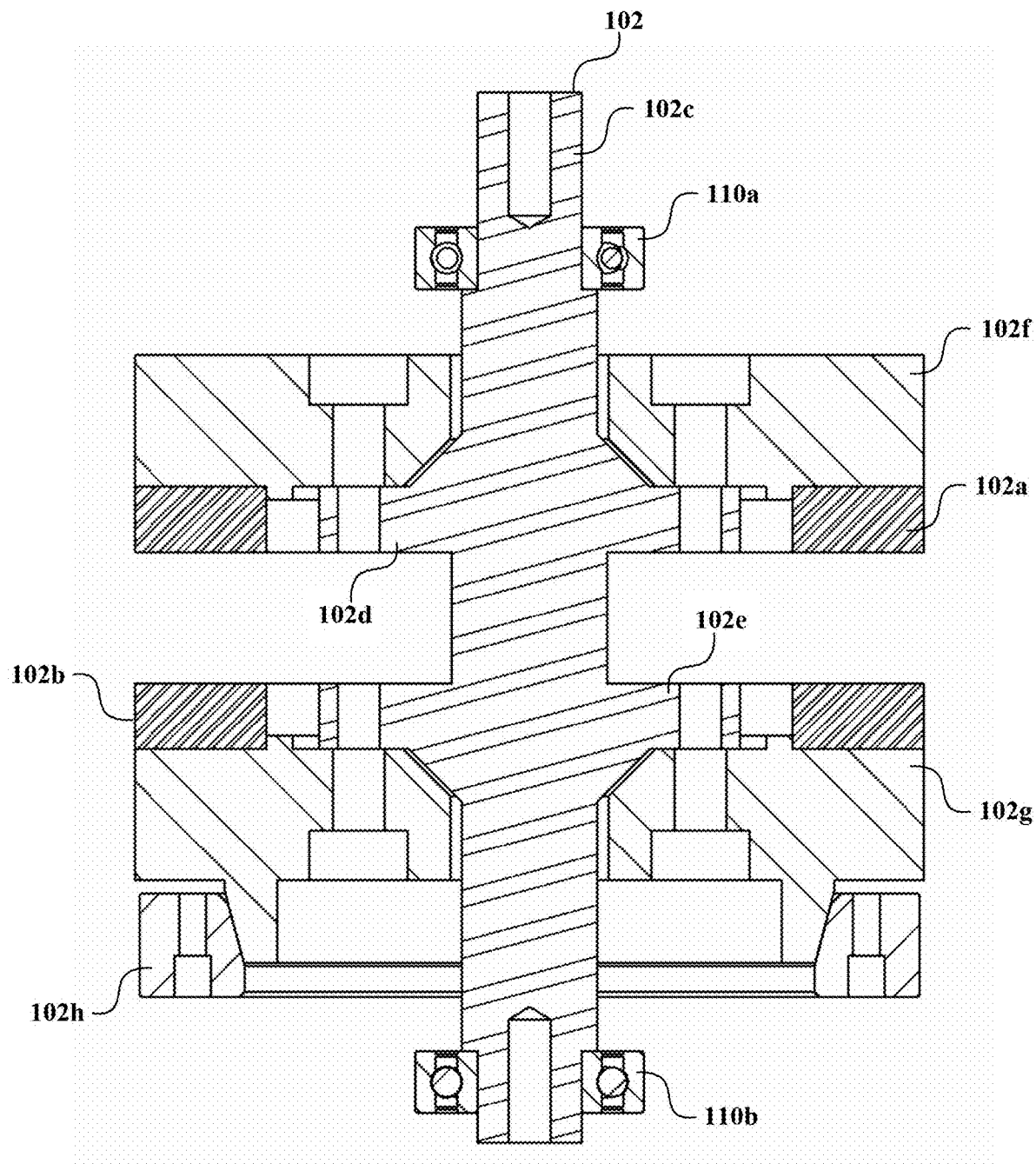
FIG. 3 illustrates a rotor as used in accordance with an embodiment of the present invention.

FIG. 3 illustrates a detailed perspective of rotor 102 in accordance with an embodiment of the present invention. Rotor 102 includes a top ring magnet assembly 102a and a bottom ring magnet assembly 102b each having an axial bore extending therethrough, a rotary shaft 102c extending through the axial bores of ring magnet assemblies 102a-b and mounted for rotational movement with ring magnet assemblies 102a-b, top rotor flange 102d and a bottom rotor flange 102e having a predetermined spacing between them for mounting ring magnet assemblies 102a-b, a top yoke 102f disposed above top ring magnet 102a and mounted on top rotor flange 102d and a bottom yoke 102g disposed below bottom ring magnet assembly 102b and mounted on bottom rotor flange 102e to constrain the magnetic flux generated by ring magnet assemblies 102a-b within the spacing between ring magnet assemblies 102a-b, and an encoder scale ring 102h to provide a reference scale for determining the angular position of rotor 102.

Ring magnet assemblies 102a-b include identical ring-shaped permanent magnets, a top ring magnet assembly 102a and a bottom ring magnet assembly 102b, as shown in FIGS. 1, 2 and 3, oriented such that its polarization is in axial direction, vertically separated to form an air gap, arranged to generate a magnetic field that interacts with the magnetic field of an electromagnet, and concentrically attached to rotor shaft 102c. Top ring magnet assembly 102a includes multiple segmented ring permanent magnets, and bottom ring magnet assembly 102b includes multiple segmented ring permanent magnets. Each of top and bottom ring magnet assemblies 102a-b is formed by segmenting a ring-shaped permanent magnet into multiple segments, positioning one segment of the ring magnet upside-down next to an unturned segment of the ring magnet, continuing this arrangement in an alternating manner to form a ring, and coupling the segments to form a ring magnet assembly. In one embodiment of the present invention, each of top and bottom ring magnet assemblies 102a-b has a diameter of about 8 cm. In each of top and bottom ring magnet assemblies 102a-b, a segmented ring magnet assembly formed is coupled with another segmented ring magnet assembly along a plane that is perpendicular to the axes of the two ring magnets and oriented such that an upside-down segment of one ring magnet is positioned above an unturned segment of the other ring magnet, the interface between the ring magnets is aligned and the ring magnets are oriented with a polarization in axial direction. Top ring magnet assembly 102a is vertically separated from bottom ring magnet assembly 102b along its axes with a gap to provide an optimal magnetic flux density between ring magnet assemblies 102a-b and the gap being at least equal to about the thickness of stator 104. Exemplary permanent magnets that can used as ring magnets include disk magnets, arc magnets, smaller electromagnets, and the like.

Figure 4:
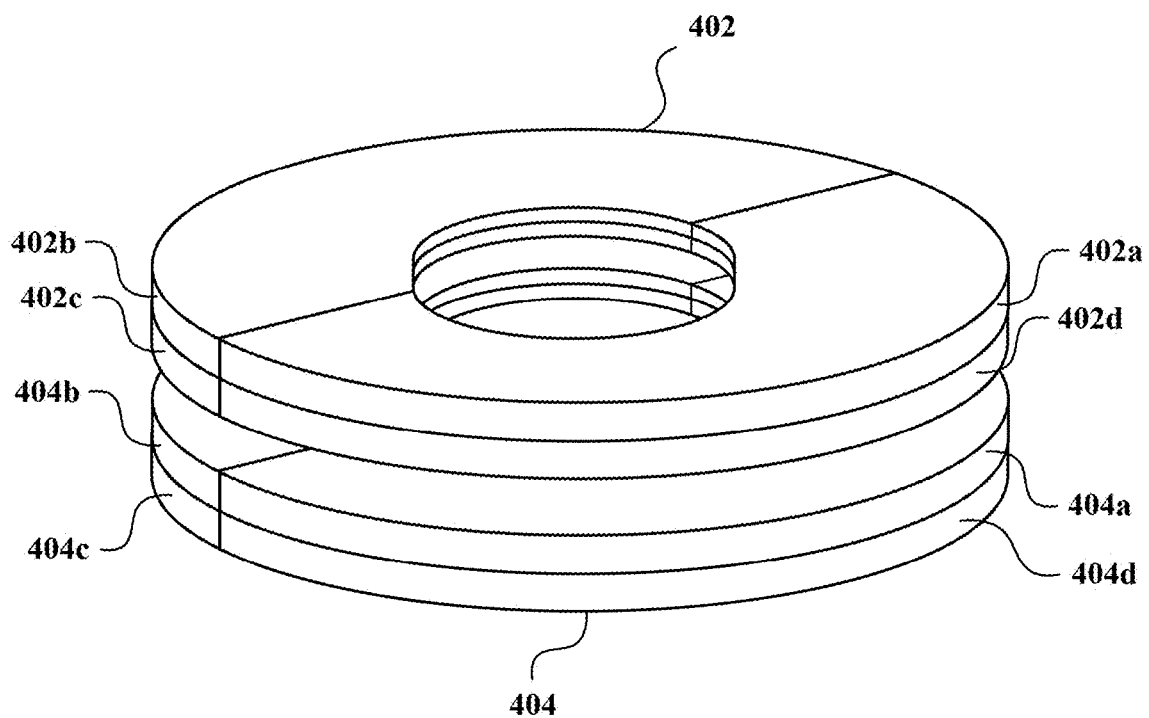
FIG. 4 illustrates a ring magnet assembly as used in accordance with an embodiment of the present invention.

In one embodiment of the present invention, ring magnet assemblies 102a-b include top ring magnet assembly 402 and bottom ring magnet assemblies 404, as shown in FIG. 4, arranged to generate a specific magnetic field along the z-axis. Top ring magnet assembly 402 includes four identical half-ring or semi-circular permanent magnets 402a-d forming two ring magnet assemblies, and bottom ring magnet assembly 404 includes four identical half-ring or semi-circular permanent magnets 404a-d forming two ring magnets assemblies, as shown in FIG. 4. Each ring magnet assembly is formed by separating a ring-shaped permanent magnet into two semi-circular rings, positioning one semi-circular ring upside-down and coupling with the other unturned semi-circular ring. Each ring magnet formed is further coupled to another identical ring magnet along a plane that is perpendicular to the axes of the two ring magnets and oriented such that an upside-down semi-circular ring is positioned above an unturned semi-circular ring, the interface between the semicircular ring magnets is aligned and the semicircular ring magnets is oriented with a polarization in axial direction, as shown in FIG. 4. Top ring magnet assembly 402 is vertically separated from bottom ring magnet assembly 404 along its axes with a predetermined gap to provide an optimal magnetic flux density between top ring magnet assembly 402 and bottom ring magnet assembly 404 and is the gap being at least equal to about the thickness of stator 104. In one embodiment of the present invention, top ring magnet assembly 402 is vertically separated from bottom ring magnet assembly 404 along its axes with a gap of about 13 mm.

Figure 5:
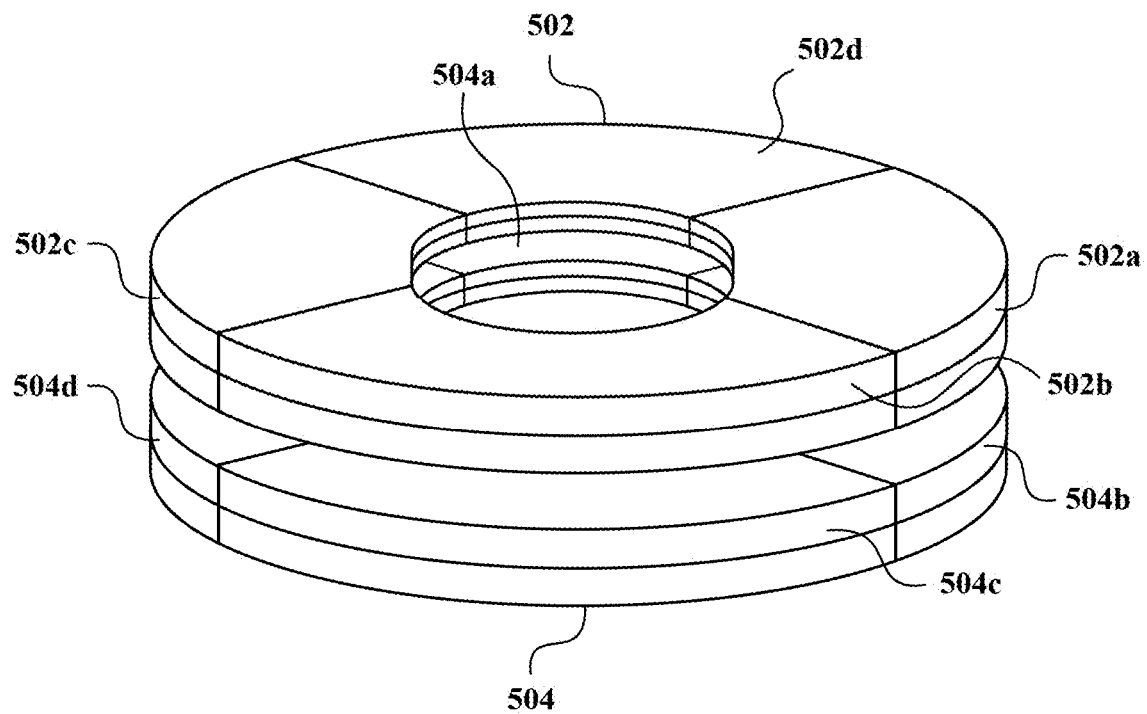
FIG. 5 illustrates an alternate ring magnet assembly as used in accordance with embodiments of the present invention.

In another embodiment of the present invention, ring magnet assemblies 102a-b include top ring magnet assembly 502 and bottom ring magnet assemblies 504, as shown in FIG. 5, arranged to generate a specific magnetic field along the z-axis. Top ring magnet assembly 502 includes two ring magnet assemblies with each ring magnet assembly formed by four identical segmented ring or quarter-ring permanent magnets 502a-d, and bottom ring magnet assembly 504 includes two ring magnet assemblies with each ring magnet assembly formed by four identical segmented ring or quarter-ring permanent magnets 504a-d. Each ring magnet assembly of top ring magnet assembly 502 is formed by partitioning a ring-shaped permanent magnet into four segments 502a-d, positioning segmented ring permanent magnet 502a upside-down next to unturned segmented ring permanent magnets 502b, positioning segmented ring permanent magnet 502c upside-down between unturned segmented ring permanent magnets 502b and 502d, and positioning segmented ring permanent magnet 502d between upside-down segmented ring permanent magnets 502a and 502c such that upside-down and unturned segmented ring permanent magnets 502a-d are arranged in an alternating manner, and coupling the alternating arrangement of four segmented ring permanent magnets 502a-d to form a ring magnet assembly. Two ring magnet assemblies of top ring magnet assembly 502 are coupled along a plane that is perpendicular to the axes of the two ring magnets. Each ring magnet assembly of bottom ring magnet assembly 504 is formed by partitioning a ring-shaped permanent magnet into four segments 504a-d, positioning segmented ring permanent magnet 504a upside-down next to unturned segmented ring permanent magnets 504b, positioning segmented ring permanent magnet 504c upside-down between unturned segmented ring permanent magnets 504b and 504d, and positioning segmented ring permanent magnet 504d between upside-down segmented ring permanent magnets 504a and 504c such that upside-down and unturned segmented ring permanent magnets 504a-d are arranged in an alternating manner, and coupling the alternating arrangement of four segmented ring permanent magnets 504a-d to form a ring magnet assembly. Two ring magnet assemblies of bottom ring magnet assembly 504 are coupled along a plane that is perpendicular to the axes of the two ring magnets. Top ring magnet assembly 502 and bottom ring magnet assembly 504 are oriented such that an upside-down segment of one ring is positioned above an unturned segment of the other ring, the interface between the ring magnets is aligned and the ring magnets are oriented with a polarization in axial direction. Top ring magnet assembly 502 is vertically separated from bottom ring magnet assemblies 504 along its axes with a predetermined gap to provide an optimal magnetic flux density between top ring magnet assembly 402 and bottom ring magnet assembly 404 and the gap being at least equal to about the thickness of stator 104. In one embodiment of the present invention, top ring magnet assembly 502 is vertically separated from bottom ring magnet assemblies 504 along its axes with a gap of about 13 mm.

Rotor shaft 102c is shaped as a stepped cylinder extending from cantilever 108 through the axial bores of ring magnets 102a-b to baseplate 106 and mounted to cantilever 108 and baseplate 106 for rotational movement with ring magnets 102a-b, as shown in FIGS. 2 and 3. In one embodiment of the present invention, rotor shaft 102c is made from stainless steel. In another embodiment of the present invention, rotor shaft 102c is made from ferromagnetic materials. In one embodiment of the present invention, rotor shaft 102c has a length of about 10 cm and a diameter of about 15 cm. Rotor shaft 102c is provided at the outer circumferential surface a top flange 102d and a bottom flange 102e for receiving on its outer circumferential surface axial bores of ring magnets 102a-b and having a diameter substantially equal to the diameter of the axial bores of ring magnets 102a-b, as shown in FIG. 3. Top flange 102d and bottom flange 102e are positioned on rotor shaft 102c such that ring magnet assemblies 102a-b when mounted on top and bottom flanges 102d-e include an air gap therebetween. In some embodiments of the present invention, top and bottom flanges 102d-e further include a tapered surface having a predetermined height along the axial direction of rotor shaft 102c with a predetermined taper angle from the outer circumferential surface of rotor shaft 102c to distal surfaces of top and bottom flanges 102d-e.

Top yoke 102f is disposed above top ring magnet 102a and bottom yoke 102g is disposed below bottom ring magnet assembly 102b. Each of yokes 102f-g extend axially along rotor shaft 102c for a predetermined thickness and extend radially from rotor shaft 102c to about circumferential edge of ring magnet assemblies 102a-b to provide a mounting surface for each of ring magnet assemblies 102a-b. Ring magnet assemblies 102a-b face each other when mounted on the mounting surfaces of each of yokes 102f-g and yokes 102f-g constrain the magnetic flux generated by ring magnet assemblies 102a-b within the spacing between ring magnet assemblies 102a-b. In one embodiment of the present invention, yokes 102f-g are made from ferromagnetic materials. By way of non-limiting examples, exemplary ferromagnetic materials may include one or more of the following (with Curie temperature, in K, in parenthesis): Co (1388), Fe (1043), MnBi (630), Ni (627), MnSb (587), $CrO_2$ (386), MnAs (318), Gd (292), Tb (219), Dy (88), EuO (69), or other similar ferromagnetic materials. Each of yokes 102f-g include axial bores for receiving rotor shaft 102c such that disposition of top yoke 102f above top ring magnet 102a extends rotor shaft 102c through the axial bore of top yoke 102f and disposition of bottom yoke 102g below bottom ring magnet 102b extends rotor shaft 102c through the axial bore of bottom yoke 102g.

Each of yokes 102f-g further include bores positioned on its surface to align with threaded bores in flanges 102d-e and to receive fasteners for attaching yokes 102f-g to flanges 102d-e. When yokes 102f-g are fastened to flanges 102d-e, yokes 102f-g are aligned with flanges 102d-e and fixed to rotor shaft 102c such that yokes 102f-g are capable of rotating with rotor shaft 102c but prevented from moving radially from rotor shaft 102c. In embodiments of the present invention wherein top and bottom flanges 102d-e further include a tapered surface, proximal surfaces of yokes 102f-g further include tapered mating surface for guiding and receiving the tapered surfaces of top and bottom flanges 102d-e and for aligning yokes 102f-g with top and bottom flanges 102d-e. Ring magnet assemblies 102a-b are positioned by attractive magnetic forces to yokes 102f-g such that the slits between the top and bottom ring magnets 102a-b are aligned and such that ring magnet assemblies 102a-b are capable of rotating with rotor shaft 102c but prevented from moving radially from rotor shaft 102c.

Encoder scale ring 102h includes a circular scale device attached to rotor shaft 102c and provides a reference scale for the detection of rotational movement of rotor shaft 102c. The scale device of encoder scale ring 102h includes a scale pattern with a predetermined division positioned on the circumferential surface of the scale device and the scale pattern is detectable by encoder 112. In one embodiment of the present invention, encoder scale ring 102h is attached to a circumferential surface of rotor shaft 102c using fasteners. In another embodiment of the present invention, encoder scale ring 102h is attached to the outer surface of bottom yoke 102g. In such embodiments, bottom yoke 102g is provided at the outer surface a tapered ring having a predetermined width for receiving and centering encoder scale ring 102h, as shown in FIGS. 2 and 3. Inner surface of the tapered ring extends axially from distal surface of bottom yoke 102g to a width substantially equal to the depth of mating surface of encoder scale ring 102h and outer surface of the tapered ring extends from distal surface of bottom yoke 102g with a taper angle substantially equal to the taper angle of a mating surface of encoder scale ring 102h. Bottom yoke 102g further includes threaded bores positioned on its surface to align with bores in encoder scale ring 102h and to receive fasteners for attaching encoder scale ring 102h to bottom yoke 102g, as shown in FIGS. 2 and 3.

Bearing assembly 110 is positioned on rotor shaft 102c to provide axial alignment to rotor shaft 102c extending from base plate 106 through the axial bores of top and the bottom ring magnets 102a-b to cantilever 108, and for constraining the radial movement of rotor 102 during rotation of rotor 102. In one embodiment of the present invention, bearing assembly 110 includes top bearing assembly 110a positioned at a proximal end of rotor shaft 102c and bottom bearing assembly 110b positioned at distal end of rotor shaft 102c, as shown in FIGS. 1 and 2, to support and align rotor shaft 102c. Base plate 106 receives bottom bearing assembly 110b to mount rotor shaft 102c at the bottom and cantilever 108 receives top bearing assembly 110a to mount rotor shaft 102c at the top, and provide axial alignment for rotor shaft 102c, such that rotor shaft 102c axis of rotation extends from base plate 106 to cantilever 108. In an exemplary embodiment of the present invention, top bearing assembly 110a is a radial bearing having an outer diameter substantially equal to the diameter of a mounting bore in cantilever 108 positioned to receive top bearing assembly 110a and a bottom bearing assembly 110a is a radial bearing having an outer diameter substantially equal to the diameter of a mounting bore in base plate 106 positioned to receive bottom bearing assembly 110a.

Figure 8:
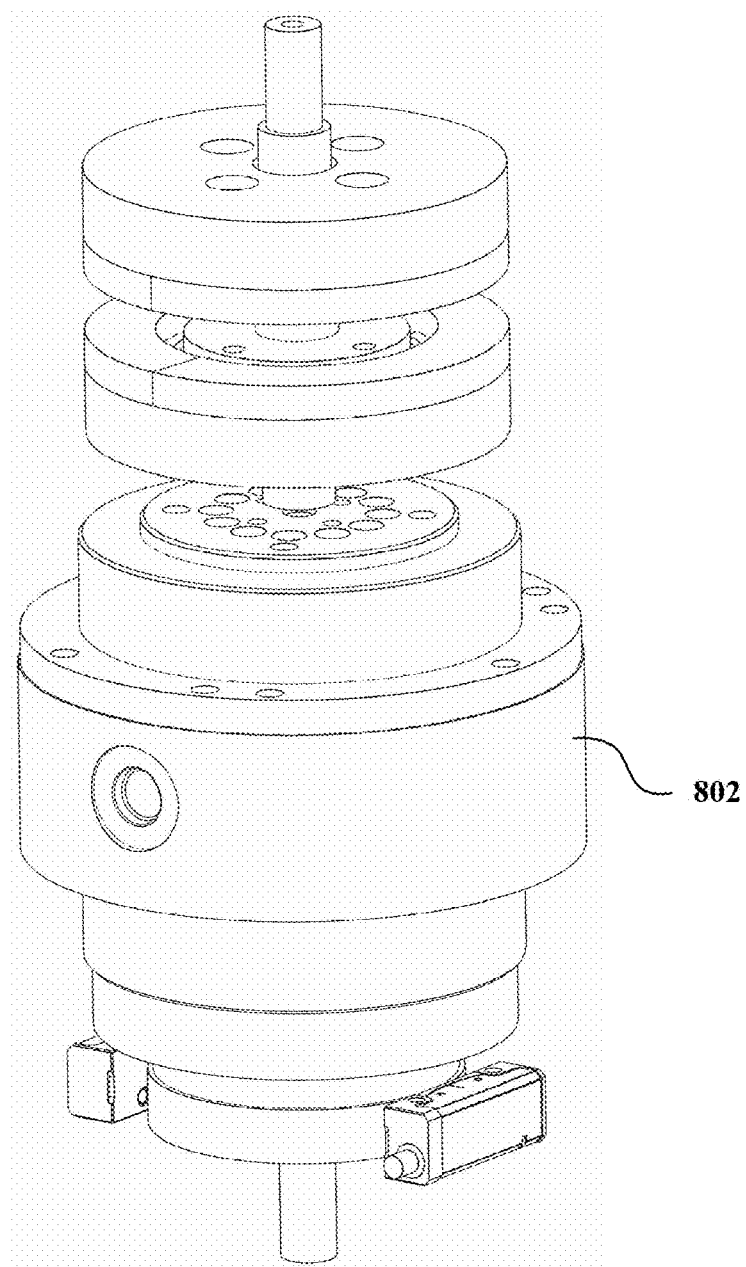
FIG. 8 illustrates an alternate rotor assembly as used in accordance with alternate embodiments of the present invention.

In another embodiment of the present invention, bearing assembly 110 includes an air bearing assembly 802 positioned below bottom yoke 102g, as shown in FIG. 8, to support rotor shaft 102c and for constraining the radial movement of rotor 102 during rotation of rotor 102. Air bearing assembly 802 includes a rotor rigidly connected to rotor shaft 102c and housed in between air bearing stator surfaces embedded inside a cylindrical housing. Compressed gas is provided between air bearing assembly 802 rotor and air bearing stator surfaces to float air bearing assembly 802 rotor for providing frictionless rotation of air bearing assembly 802 rotor and rotor shaft 102c connected to air bearing assembly 802 rotor.

Encoder 112 is positioned adjacent to encoder scale ring 102h for recording the angular position of rotor 102 as determined from a reference scale of the angular position of rotor 102 provided by encoder scale ring 102h. Encoder 112 includes encoder reader heads 112a and 112b for reading the reference scale values of encoder scale ring 102h, and encoder mounting blocks 112c and 112d for supporting encoder reader heads 112a and 112b and for the alignment and adjustment of encoder reader heads 112a and 112b relative to encoder scale ring 102h. In one embodiment of the present invention, encoder reader heads 112a and 112b are mounted on base plate 106. Encoder reader heads 112a and 112b work in conjunction to suppress a first-order runout caused by non-concentric mounting of the encoder scale ring 102h on rotor shaft 102c.

Stator 104 includes an electromagnetic coil 104a for generating a magnetic field that interacts with the magnetic field of ring magnet assemblies 102a-b, printed circuit board 104b to provide a medium for accommodating electromagnetic coil 104a, and standoffs 104c to position electromagnetic coil 104a in a gap between ring magnet assemblies 102a-b such that at least a portion of electromagnetic coil 104a is overlapped by at least a portion of ring magnet assemblies 102a-b. Each individual coil in electromagnetic coil 104a may be made from a conductive material, such as copper (or a similar alloy) wire and may be constructed using conventional fabrication or winding techniques known in the art. Electromagnetic coil 104a may be fabricated with predetermined windings or turns on each side of printed circuit board 104b. Multiple printed circuit boards, with each printed circuit board having electromagnetic coil 104a, may be layered and coupled to form a multi-layered printed circuit board.

Figure 6:
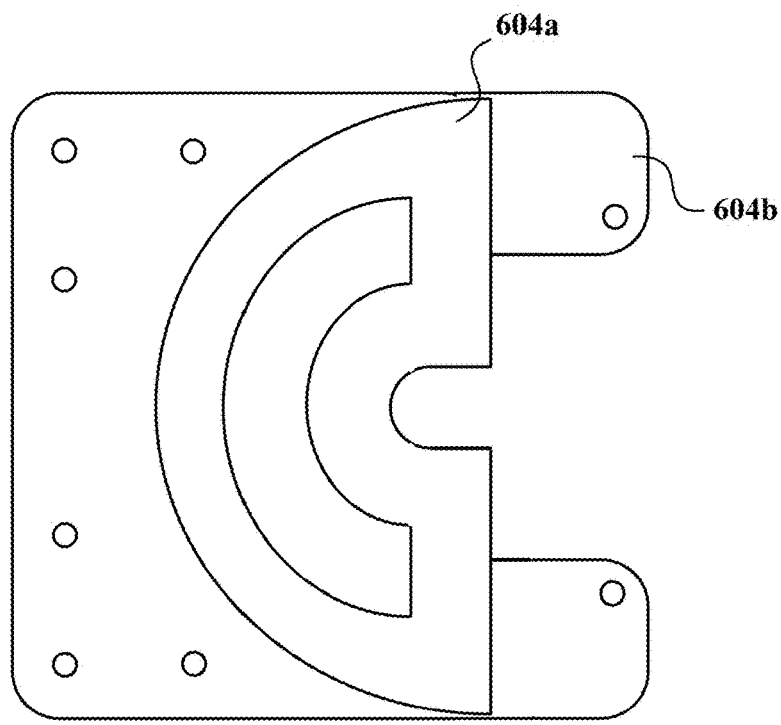
FIG. 6 illustrates (A) an electromagnetic coil as used in accordance with alternate embodiments of the present invention, and (B) a ring magnet assembly and electromagnet coils as used in accordance with embodiments of the present invention.
Figure 6:
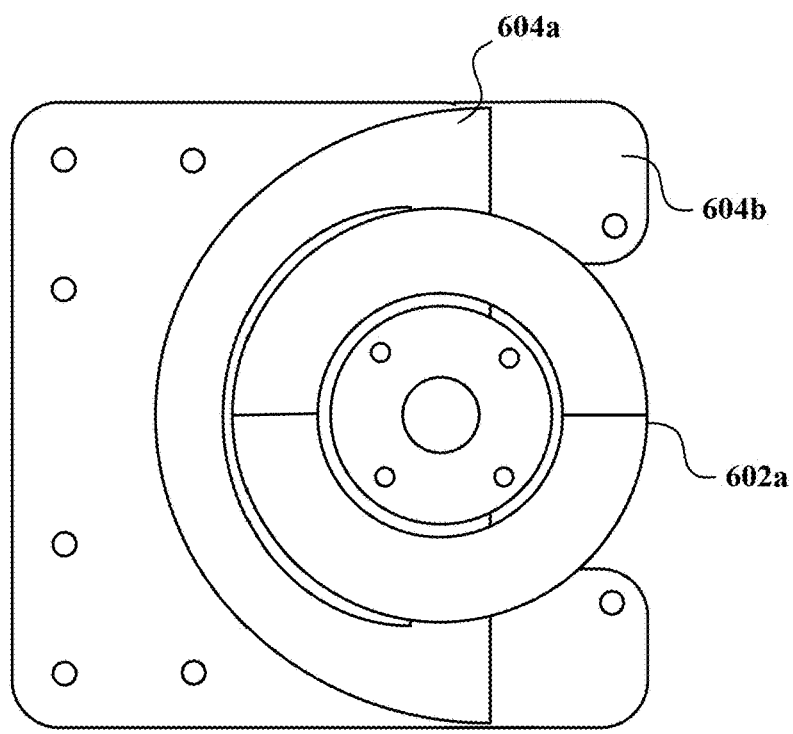

In one embodiment of the present invention, electromagnetic coil 104a is a D-shaped electromagnetic coil 604a having predetermined turns and fabricated on a printed circuit board 604b, as shown in FIG. 6(A). D-shaped electromagnetic coil 604a can be fabricated on both sides of printed circuit board 604b having a predetermined thickness. D-shaped electromagnetic coil 604a is capable of being fixed in space and vertically centered in the air gap between top and bottom ring magnet assemblies 602a-b, as shown in FIG. 6(B) (bottom ring magnet assembly 602b not shown), such that at least a portion of electromagnetic coil 604a is overlapped by at least a portion of each of ring magnet assemblies 602a-b. Multiple printed circuit boards, with each printed circuit board having D-shaped electromagnetic coil 604a can be layered and coupled to each other to form stator 104. In an exemplary embodiment, stator 104 is formed using eight layers of printed circuit boards having D-shaped coils, with each printed circuit board having a thickness of about 0.8 mm. Each printed circuit board includes a D-shaped coil on each surface with each coil having 33 turns. The cross-sectional dimension of each trace in the coil is about 0.36 mm by 0.71 mm and each trace is separated by about 0.125 mm. In the exemplary embodiment, stator 104 is formed using eight layers of printed circuit boards having D-shaped coils with 33 turns each resulting in a total of 528 turns and providing a resistance of about 120 ohms.

Figure 7:
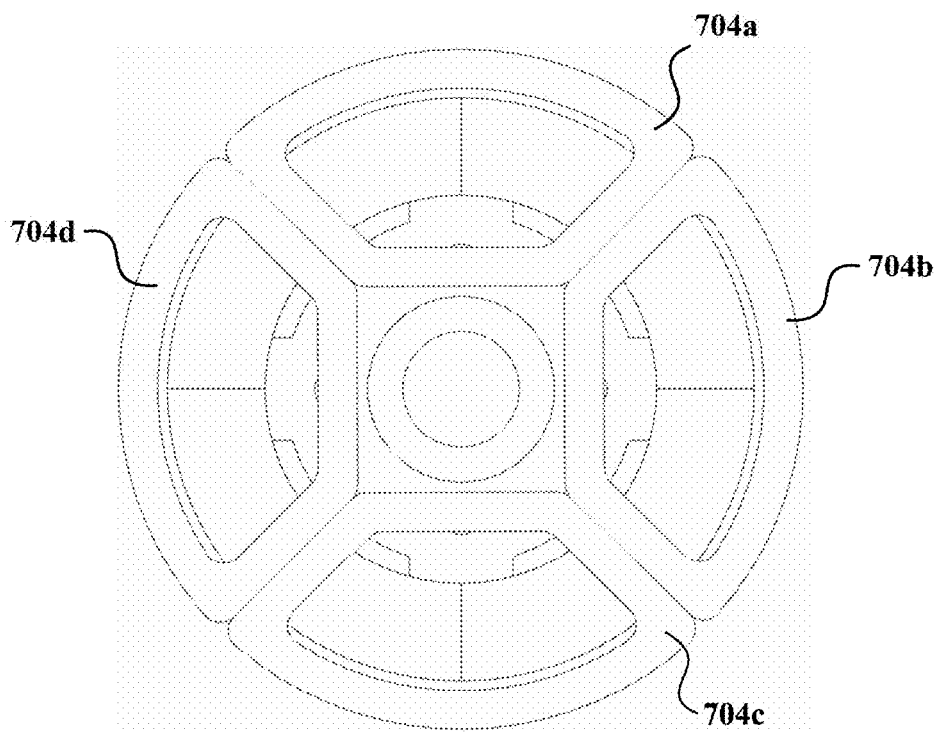
FIG. 7 illustrates (A) an alternate electromagnetic coil as used in accordance with alternate embodiments of the present invention, and (B) an alternate ring magnet assembly and electromagnet coils as used in accordance with embodiments of the present invention.
Figure 7:
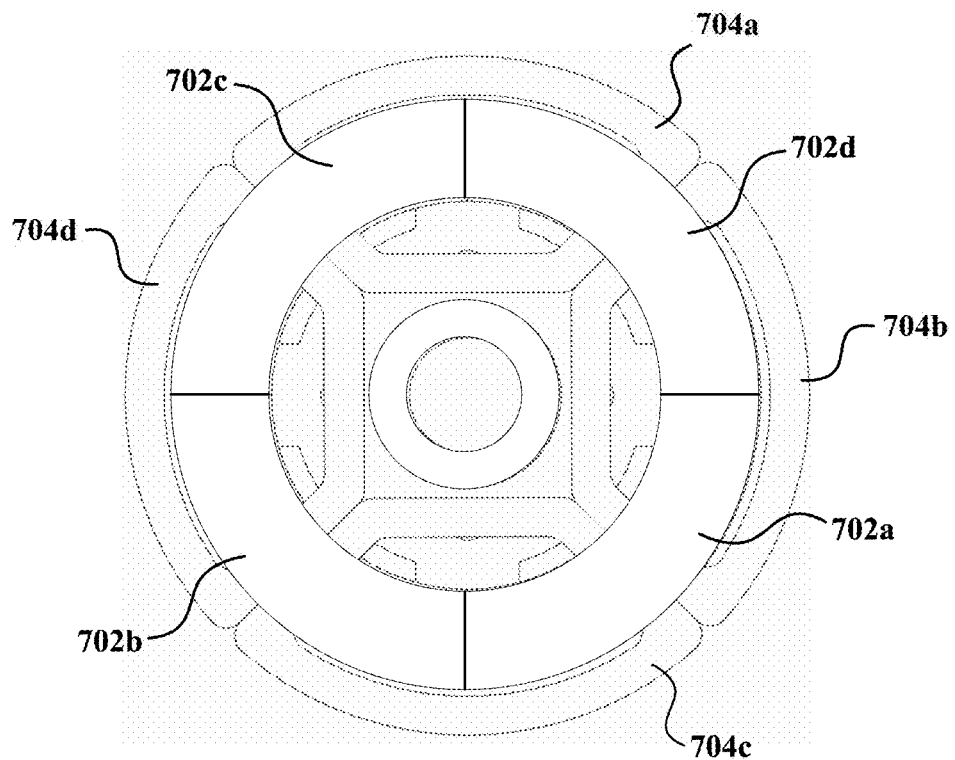

In an alternate embodiment of the present invention, electromagnetic coil 104a includes multiple segments of coils 704a-d arranged in a circular manner, as shown in FIGS. 7(A) and 7 (B), and capable of being fixed in space and vertically centered in a gap between ring magnet assemblies 702a-d. Each segment of coils 704a-d is fabricated on both sides of a printed circuit board and includes a predetermined number of turns. Multiple printed circuit boards, with each printed circuit board having a segment of coils 704a-d, are connected to form multiple segments of coils 704a-d arranged in a circular manner, as shown in FIGS. 7(A) and 7(B). The connected printed circuit boards with multiple segments of coils 704a-d are fixed in space and vertically centered in a gap between ring magnet assemblies 702a-d such that at least a portion of electromagnetic coil 704 is overlapped by at least a portion of top and bottom ring magnet assemblies 702a-d, as shown in FIG. 7(B) (bottom ring magnet assembly not shown). Each segment of coils 704a-d is enclosed by at least one segment of ring magnet assemblies 702a-d, as further shown in FIG. 7(B).

Stator 104 is supported by a plurality of standoffs 104c with each having a length such that electromagnetic coil 104a is centered in a gap between top and bottom ring magnet assemblies 102a-b, as shown in FIG. 1 (bottom ring magnet assembly 102b not shown). In one embodiment of the present invention, each of standoffs 104c has a length of about 40 cm. Each of standoffs 104c is shaped as a column with threaded bores centered on its top and bottom surfaces such that standoffs 104b can be fastened to printed circuit board 104b of stator 104 and base plate 106. In one embodiment of the present invention, each of standoffs 104c is a hexagonal shaped column. In another embodiment of the present invention, each of standoffs 104c is a cylindrical column. Exemplary material that can be used for making standoffs 104c include plastic, machinable glass-ceramic (e.g., macor), composite materials (e.g., fiberglass and carbon fiber), and other non-metallic materials. Electromagnetic coil 104a is connected to two physical relays that are in turn connected to a digital voltmeter (DVM) and a current source. The DVM and current source are connected to a computer and are controlled by a controller.

During typical operation of electronic torque realization apparatus 100 in accordance with embodiments of the present invention, dual modes of operation are involved to produce and measure torque-spin mode and torque mode. In spin mode, also known as calibration mode, the controller sends a signal to the current source to drive rotor 102 at relatively constant angular velocity. After rotor 102 reaches a desired angular velocity, the DVM measures voltage induced within stator 104 due to the spin motion of ring magnet assemblies 102a-b above and below electromagnetic coil 104a. A calibration profile is generated by mapping repeated measurements of the voltage as ring magnet assemblies 102a-b spins at a relatively constant angular velocity. Torque produced along the axis of rotor 102 when current is applied to electromagnetic coil 104a at an angular position of rotor 102 can be determined from a calibration factor obtained from the calibration profile. In torque mode, a servo control loop, such as a proportional, integral, and derivative (PID) control loop, is used to send a signal to the current source to hold rotor 102 at a predetermined angular position. If a torque is applied to rotor shaft 102c, the control loop will maintain the position of rotor 102 at the predetermined angular position by increasing or decreasing current through electromagnetic coil 104a. The current driven through electromagnetic coil 104a is measured by the DVM either directly or by shunting the current through a calibrated standard resistor and measuring the voltage drop. Torque produced by electronic torque realization apparatus 100 can be calculated by multiplying the current with the calibration factor at the angular position. Calibration of a DUT, such as a torque watch or torque wrench, can be performed by affixing the DUT to rotor shaft 102c in the torque mode, manually rotating the DUT to several values within the operating range of the DUT, recording torque produced by electronic torque realization apparatus 100 at each DUT value, and generating a calibration curve for the DUT from the recorded torque values.

Reference now to the specific examples which follow will provide a clearer understanding of systems in accordance with embodiments of the present invention. The examples should not be construed as a limitation upon the scope of the present invention.

In the following examples, consistency and performance of electronic torque realization apparatus 100 was determined by measuring a calibration factor in spin mode ($\beta_S(\phi)$) and a calibration factor in torque mode ($\beta_\tau(\phi)$). $\beta_\tau(\phi)$ is calculated by applying a known torque in the torque mode.

Example 1

In spin mode, the rotating ring magnet assembly of electronic torque realization apparatus in accordance with an embodiment of the present invention was driven at relatively constant angular velocity $\dot\phi \approx 3$ rad/s using a constant stream of compressed air. In order to determine $\beta_S(\phi)$, the rotation angle $\phi$ of the ring magnet assembly as well as the induced voltage V through the electromagnetic coil was measured simultaneously during the magnet spins. A square wave signal generated by an I/O counter/timer PCI card served as a clock to synchronize the start of each measurement as well as a hardware trigger for taking each V and $\phi$ data point. The voltage was measured using a multimeter (Keysight 34465A) and the angle was measured using an encoder (US Digital E2 encoder). Because each $\phi$ measurement is coupled with a timestamp, the time derivative between each pair of points yields the angular velocity of the ring magnet $\dot\phi$. The last voltage point taken is dropped to account for the one fewer $\dot\phi$ points compared to the number of $\phi$ points. The measured V values are then divided by their corresponding $\dot\phi$ values to obtain $\beta_S(\phi)$. Here, electronic torque realization apparatus undergoes 42 magnet revolutions or 3988 data points and the calculated $\beta_S(\phi)=0.2405$ Tm$^2$ at $\phi=92$ degrees. The $\beta_S(\phi)$ values were fit with a second order polynomial in the range of 50-130 degrees with a standard deviation of the residuals of 0.21%.

In torque mode, the electromagnetic coil is disconnected from the voltmeter and connected to a programmable voltage source (Rigol DP832) to generate a drive current. Once current flows, the ring magnets rotate counterclockwise until the two slits separating the two magnet rings are aligned with the straight segments of the coil, i.e., the static equilibrium point where $\tau=0$, which in this case is approximately where $\phi=0$ or 180 degrees. Here, a low range [0-2.4 in oz] torque watch is attached via a coupler to the top of the rotor shaft. The voltage source is set statically to 6 V, or the equivalent of 50.86 mA through the coil. The torque watch is rotated clockwise by hand against the electronic torque realization apparatus torque direction and held at a new equilibrium position $\phi=92$ degrees, where the analog torque watch reading of $\tau=1.80$ in oz (13 mN m) is measured. A calibration using a mass on lever arm indicates the torque watch reads high by 4.31%. Given these measurements and after applying the torque watch correction, the calibration factor in torque mode was determined to be $\beta_\tau(\phi)=0.240$ Tm$^2$. This absolute realization instrument is used to import the spin mode $\beta_S(\phi)$ into torque mode to calculate $\tau(\phi)$, which is used for confirming both modes are in agreement and characterizing the performance of this instrument.

Example 2

In the spin mode, electronic torque realization apparatus in accordance with an embodiment of the present invention is flipped by 90 degrees and operated with the rotor shaft horizontal such that a torque generated by a gravitational mass can be directly applied, bypassing the need for the torque watch. The rotating ring magnet assembly is driven at relatively constant angular velocity using a constant stream of compressed air. The $\dot\phi$ varies more within each revolution due to minor imbalances in the rotating assembly having a greater impact compared to the vertical orientation. The spin mode measurement of $\beta_S(\phi)$ presented here undergoes 49 magnet revolutions or 3967 data points and the calculated $\beta_S(\phi)=0.2411$ Tm$^2$ at $\phi=95$ degrees. A second order polynomial data fit, performed in the same manner as in Example 1, resulted in a standard deviation of the residuals of 0.18%.

In the torque mode, a precision machined aluminum balance beam was mounted rigidly along the same axis as of the rotor shaft of electronic torque realization apparatus in accordance with an embodiment of the present invention, and a mass is suspended from one end of the beam via copper wire, which was measured on an analytical balance to be 10.16 g including the wire. Though the wire was not straight when hanging, the center of mass of the suspended assembly self-aligned vertically to the center of the connection point. The effective lever arm was measured with a digital caliper (Mitutoyo) with a precision of 10 µm to be 85.79 mm. In Example 2, the voltage source was swapped out for a programmable power supply allowing closed loop control of the balance beam's rotation angle. The horizontal beam position was measured at 95 degrees relative to the encoder zero index and the current was measured using a multimeter (Agilent 3458A multimeter).

Figure 9:
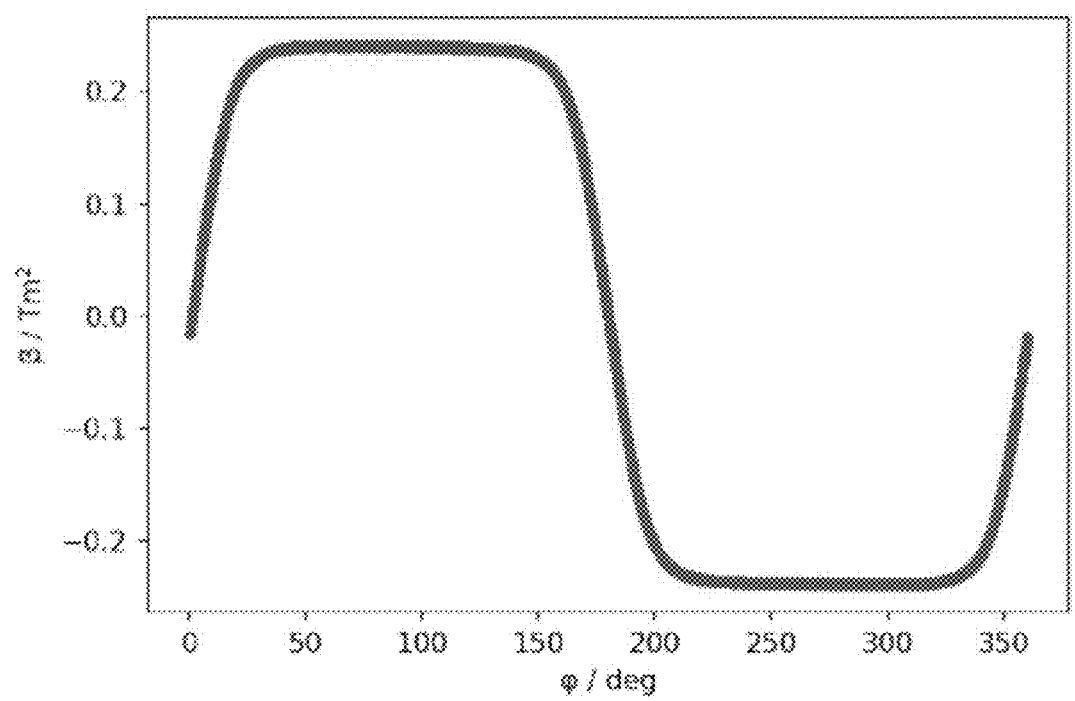
FIG. 9 illustrates a spin mode profile obtained using an electronic torque realization apparatus in accordance with alternate embodiments of the present invention.
Figure 10:
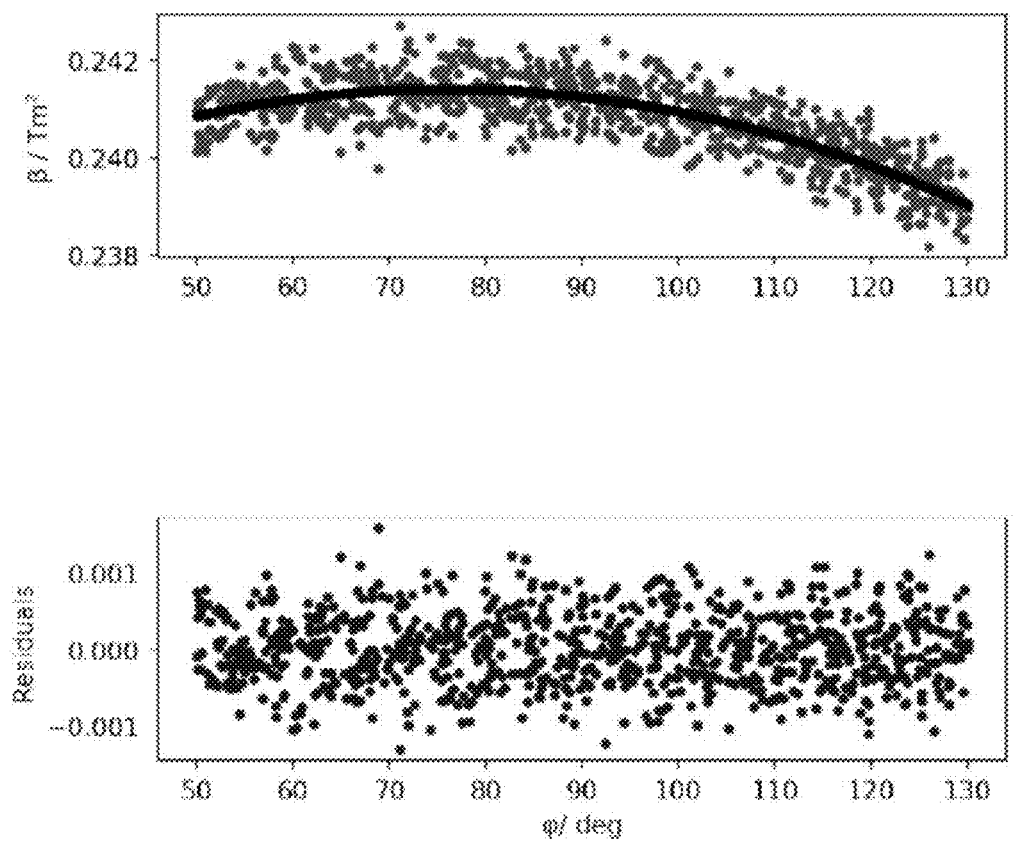
FIG. 10 illustrates an alternate view of the spin mode profile shown in FIG. 9 and residuals of a second order fit.

The results of a comparison between $\beta_S(\phi)$ and $\beta_\tau(\phi)$ in Example 1 show excellent agreement. By turning electronic torque realization apparatus on its side and bypassing the need for a torque watch, $\beta_\tau(\phi)$ can be measured more precisely by directly applying a traditional torque generated by a gravitational mass over a lever arm. FIG. 9 shows the $\beta_S(\phi)$ profile over one revolution, sampled 3967 times over 49 rotations. FIG. 10 (Top) illustrates an alternate view of the profile shown in FIG. 9 from 50 degrees to 130 degrees with a second order fit and FIG. 10 (Bottom) shows the residuals between the raw data and fit. The relative standard deviation of the residuals is approximately 0.19%. The results from Example 2 are: $\beta_S(95°)=0.2411$ Tm$^2$ and $\beta_\tau(95°)=0.2409$ Tm$^2$. The difference between the $\beta(\phi)$ values are 0.08%, marginally below the target uncertainty of 0.1%.

Electronic torque realization apparatus in accordance with embodiments of the present invention has several advantages over previous electronic torque realization apparatus. Electronic torque realization apparatus in accordance with embodiments of the present invention allows end-users to truncate the traceability chain and directly realize torque within their facilities, reducing need for transportation and outsourced calibration of mass artifacts that are used for some contemporary torque calibration procedures. Electronic torque realization apparatus in accordance with embodiments of the present invention also allows for generation of torque at lower ranges in a calibration setting than currently available using conventional torque transducers. Electronic torque realization apparatus in accordance with embodiments of the present invention can also be used in a wider torque range of calibration within a single device, reducing the need for calibration facilities to purchase and catalog multiple torque testing devices to cover operational ranges of tools. Electronic torque realization apparatus in accordance with embodiments of the present invention is more accurate than conventional torque transducers and torque calibration systems/processes. Electronic torque realization apparatus in accordance with embodiments of the present invention allows the calibration of torques continuously instead of a few discrete step using calibrated masses. Electronic torque realization apparatus in accordance with embodiments of the present invention allows for continuous logging of the generated torque and is less prone to user error caused by manual recording of mass and lever arm of the current devices in use. Electronic torque realization apparatus in accordance with embodiments of the present invention allows the calibration of torques in any orientation and not just along the horizontal rotation axis, as in deadweight calibrators. Electronic torque realization apparatus in accordance with embodiments of the present invention allows for calibrating torques on a swaying platform such as a ship or an aircraft.

Electronic torque realization apparatus in accordance with one or more embodiments of the present invention can be adapted to a variety of configurations. Embodiments of the subject invention may also include a single spinning permanent magnet interacting as described above with two or more stationary electromagnets, or one or more stationary permanent magnets interacting as described above with one or more spinning electromagnets. It is thought that electronic torque realization apparatus in accordance with various embodiments of the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

What is claimed is:

1. An apparatus for electronic torque realization of a torque tool, said apparatus comprising:
   a rotor for coupling to the torque tool, wherein the rotor comprises:
      a top ring magnet assembly comprising a first ring magnet and a second ring magnet, wherein each of the first and the second ring magnets comprises a plurality of segments coupled to form the first and the second ring magnets, wherein alternate segments of the plurality of the segments coupled to form each of the first and the second ring magnets are positioned upside-down, wherein the first ring magnet is coupled to the second ring magnet along a plane perpendicular to axes of the first and the second ring magnets, wherein the first ring magnet coupled to the second ring magnet is oriented to position the at least one upside-down segment of the plurality of segments of the first ring magnet above an unturned segment of the second ring magnet, wherein the first and the second ring magnets are oriented with a polarization in the axial direction;
      a bottom ring magnet assembly comprising a third ring magnet and a fourth ring magnet, wherein each of the third and the fourth ring magnets comprises a plurality of segments coupled to form the third and the fourth ring magnets, wherein alternate segments of the plurality of the segments coupled to form each of the third and the fourth ring magnets are positioned upside-down, wherein the third ring magnet is coupled to the fourth ring magnet along a plane perpendicular to axes of the third and the fourth ring magnets, wherein the third ring magnet coupled to the fourth ring magnet is oriented to position the at least one upside-down segment of the plurality of segments of the third ring magnet above an unturned segment of the fourth ring magnet, wherein the third and the fourth ring magnets are oriented with a polarization in the axial direction, wherein the bottom ring magnet assembly is positioned below the top ring magnet assembly and spaced apart from the top ring magnet by a gap;
      a rotor shaft extending through axial bores of the top and the bottom ring magnet assemblies, wherein the rotor shaft is mounted for rotational movement with the top and the bottom ring magnet assemblies;

a top rotor flange extending radially from the rotor shaft for receiving the top ring magnet assembly, wherein a circumferential edge of the top rotor flange receives the axial bore of the top ring magnet assembly;

a bottom rotor flange extending from the rotor shaft for receiving the bottom ring magnet assembly, wherein a circumferential edge of the bottom rotor flange receives the axial bore of the bottom ring magnet assembly, wherein the top rotor flange and the bottom rotor flange are positioned on the rotor shaft to provide the gap between the top and the bottom ring magnet assemblies;

a top yoke fastened to the top rotor flange, wherein the top yoke comprises an axial bore for receiving the rotor shaft, wherein the top yoke extends radially from the rotor shaft to a circumferential edge of the top ring magnet assembly to form a first mounting surface, wherein the top ring magnet is mounted on the first mounting surface formed by the top yoke, wherein rotating the rotor shaft rotates the top yoke fastened to the top rotor flange;

a bottom yoke fastened to the bottom rotor flange, wherein the bottom yoke comprises an axial bore for receiving the rotor shaft, wherein the bottom yoke extends radially from the rotor shaft to a circumferential edge of the bottom ring magnet assembly to form a second mounting surface, wherein the bottom ring magnet is mounted on the second mounting surface formed by the bottom yoke, wherein rotating the rotor shaft rotates the bottom yoke fastened to the bottom rotor flange;

an encoder scale ring mounted on the rotor shaft, wherein the encoder scale provides a reference scale for determining an angular position of the rotor;

a stator positioned in the gap between the top and the bottom ring magnet assemblies, wherein the stator generates a first magnetic field that interacts with a second magnetic field of the top and the bottom ring magnet assemblies, wherein the interaction of the first magnetic field generated by the stator with the second magnetic field of the top and the bottom ring magnet assemblies generates a torque on the rotor shaft;

a base plate for mounting a first end of the rotor shaft and the stator;

a cantilever for mounting a second end of the rotor shaft;

a bearing assembly positioned on the rotor shaft to provide axial alignment to the rotor shaft extending from the base plate through the axial bores of the top and the bottom ring magnets to the cantilever; and an encoder positioned on the base plate and adjacent to the encoder scale for recording the angular position of the rotor.

2. The apparatus of claim 1, wherein each of the top and the bottom ring magnet assemblies has a diameter of about 4 cm.

3. The apparatus of claim 1, wherein each of the plurality of segments coupled to form the first, the second, the third and the fourth ring magnets is a half-ring permanent magnet.

4. The apparatus of claim 1, wherein each of the plurality of segments coupled to form the first, the second, the third and the fourth ring magnets is a quarter-ring permanent magnet.

5. The apparatus of claim 1, wherein the gap between the top ring magnet assembly and the bottom ring magnet assembly is about 13 mm.

6. The apparatus of claim 1, wherein the bottom yoke further comprises a tapered ring to form a third mounting surface, and wherein mounting the encoder scale ring on the rotor shaft comprises mounting the encoder scale ring on the third mounting surface formed by the bottom yoke.

7. The apparatus of claim 1, wherein the top and the bottom yokes are made from a ferromagnetic material selected from the group comprising cobalt, iron, nickel, gadolinium, dysprosium, terbium, chromium oxide, europium oxide, a manganese/bismuth combination, a manganese/antimony combination, and a manganese/arsenic combination.

8. The apparatus of claim 1, wherein each of the top and the bottom yokes further comprises a plurality of bores positioned on its surface to align with a plurality of threaded bores on the top and the bottom rotor flanges, wherein each of the plurality of bores positioned on the top yoke receives a fastener for coupling with at least one of the plurality of the threaded bores of the top rotor flange, and wherein each of the plurality of bores positioned on the bottom yoke receives a fastener for coupling with at least one of the plurality of the threaded bores of the bottom rotor flange.

9. The apparatus of claim 1, wherein the bottom yoke further comprises a plurality of threaded bores positioned on its surface to align with a plurality of bores in the encoder scale ring for receiving fasteners to attach the encoder scale ring to the bottom yoke.

10. The apparatus of claim 1, wherein the bearing assembly comprises:

a top radial bearing mounted at a first end of the rotor shaft, wherein outer diameter of the top radial bearing is substantially equal to diameter of a mounting bore in the cantilever positioned to receive the top radial bearing; and a bottom radial bearing mounted at a second end of rotor shaft, wherein outer diameter of the bottom radial bearing is substantially equal to the diameter of a mounting bore in the base plate positioned to receive the bottom radial bearing.

11. The apparatus of claim 1, wherein the bearing assembly comprises an air bearing positioned below the bottom yoke on the rotor shaft.

12. The apparatus of claim 1, wherein the stator comprises:

a plurality of printed circuit boards configured to form a multi-layered printed circuit board;

an electromagnetic coil fabricated on each side of each of the plurality of printed circuit boards with a predetermined number of windings; and a plurality of standoffs mounted on the base to support the multi-layered printed circuit board, wherein the plurality of standoffs supporting the multi-layered printed circuit board position the electromagnetic coil in the gap between the top and the bottom ring magnet assemblies.

13. The apparatus of claim 12, wherein the electromagnet coil fabricated on each of the printed circuit board is a D-shaped electromagnetic coil, and wherein at least a portion of the D-shaped electromagnetic coil is overlapped by at least a portion of each of the top and the bottom ring magnet assemblies.

14. The apparatus of claim 13, wherein the D-shaped electromagnet coil fabricated on each side of each of the plurality of the printed circuit board comprises 33 windings, and wherein the multi-layered printed circuit board comprises eight layers of the printed circuit boards.

15. The apparatus of claim 1, wherein the stator comprises:
   a plurality of printed circuit boards configured to form a multi-layered printed circuit board;
   an electromagnetic coil comprising a plurality of segments of coils arranged to form a circular shape, wherein the electromagnetic coil is fabricated on each side of each of the plurality of printed circuit boards forming the multi-layered printed circuit board, wherein at least a portion of the electromagnetic coil is overlapped by at least a portion of each of the top and the bottom ring magnet assemblies; and
   a plurality of standoffs mounted on the base to support the multi-layered printed circuit board, wherein the plurality of standoffs supporting the multi-layered printed circuit board position the electromagnetic coil in the gap between the top and the bottom ring magnet assemblies.

16. An apparatus for electronic torque realization of a torque tool, said apparatus comprising:
   a rotor for coupling to the torque tool, wherein the rotor comprises:
      a top ring magnet assembly comprising a first ring magnet and a second ring magnet, wherein each of the first and the second ring magnets comprises a plurality of half-ring permanent magnets coupled to form the first and the second ring magnets, wherein alternate half-ring permanent magnets of the plurality of the half-ring permanent magnets coupled to form each of the first and the second ring magnets are positioned upside-down, wherein the first ring magnet is coupled to the second ring magnet along a plane perpendicular to axes of the first and the second ring magnets, wherein the first ring magnet coupled to the second ring magnet is oriented to position the at least one upside-down half-ring permanent magnet of the plurality of half-ring permanent magnets of the first ring magnet above an unturned half-ring permanent magnet of the second ring magnet, wherein the first and the second ring magnets are oriented with a polarization in the axial direction;
      a bottom ring magnet assembly comprising a third ring magnet and a fourth ring magnet, wherein each of the third and the fourth ring magnets comprises a plurality of half-ring permanent magnets coupled to form the third and the fourth ring magnets, wherein alternate half-ring permanent magnets of the plurality of the half-ring permanent magnets coupled to form each of the third and the fourth ring magnets are positioned upside-down, wherein the third ring magnet is coupled to the fourth ring magnet along a plane perpendicular to axes of the third and the fourth ring magnets, wherein the third ring magnet coupled to the fourth ring magnet is oriented to position the at least one upside-down half-ring permanent magnet of the plurality of half-ring permanent magnets of the third ring magnet above an unturned half-ring permanent magnet of the fourth ring magnet, wherein the third and the fourth ring magnets are oriented with a polarization in the axial direction, wherein the bottom ring magnet assembly is positioned below the top ring magnet assembly and spaced apart from the top ring magnet by a gap;
      a rotor shaft extending through axial bores of the top and the bottom ring magnet assemblies, wherein the rotor shaft is mounted for rotational movement with the top and the bottom ring magnet assemblies;
      a top rotor flange extending radially from the rotor shaft for receiving the top ring magnet assembly, wherein a circumferential edge of the top rotor flange receives the axial bore of the top ring magnet assembly;
      a bottom rotor flange extending from the rotor shaft for receiving the bottom ring magnet assembly, wherein a circumferential edge of the bottom rotor flange receives the axial bore of the bottom ring magnet assembly, wherein the top rotor flange and the bottom rotor flange are positioned on the rotor shaft to provide the gap between the top and the bottom ring magnet assemblies;
      a top yoke fastened to the top rotor flange, wherein the top yoke comprises an axial bore for receiving the rotor shaft, wherein the top yoke extends radially from the rotor shaft to a circumferential edge of the top ring magnet assembly to form a first mounting surface, wherein the top ring magnet is mounted on the first mounting surface formed by the top yoke, wherein rotating the rotor shaft rotates the top yoke fastened to the top rotor flange;
      a bottom yoke fastened to the bottom rotor flange, wherein the bottom yoke comprises an axial bore for receiving the rotor shaft, wherein the bottom yoke extends radially from the rotor shaft to a circumferential edge of the bottom ring magnet assembly to form a second mounting surface, wherein the bottom ring magnet is mounted on the second mounting surface formed by the bottom yoke, wherein the bottom yoke further comprises a tapered ring to form a third mounting surface, wherein rotating the rotor shaft rotates the bottom yoke fastened to the bottom rotor flange;
      an encoder scale ring mounted on the third mounting surface formed by the bottom yoke, wherein the encoder scale provides a reference scale for determining an angular position of the rotor;
   a stator comprising a D-shaped electromagnetic coil fabricated on each side of each of a plurality of printed circuit boards with a predetermined number of windings, wherein the stator is positioned in the gap between the top and the bottom ring magnet assemblies, wherein at least a portion of the D-shaped electromagnetic coil is overlapped by at least a portion of each of the top and the bottom ring magnet assemblies, wherein the stator generates a first magnetic field that interacts with a second magnetic field of the top and the bottom ring magnet assemblies, wherein the interaction of the first magnetic field generated by the stator with the second magnetic field of the top and the bottom ring magnet assemblies generates a torque on the rotor shaft;
   a base plate for mounting a first end of the rotor shaft and the stator;
   a cantilever for mounting a second end of the rotor shaft;
   a top radial bearing mounted at a first end of the rotor shaft, wherein outer diameter of the top radial bearing is substantially equal to diameter of a mounting bore in the cantilever positioned to receive the top radial bearing;
   a bottom radial bearing mounted at a second end of rotor shaft, wherein the outer diameter of the bottom radial bearing is substantially equal to diameter of a mounting bore in the base plate positioned to receive the bottom radial bearing, wherein the top and the bottom radial bearings provide axial alignment to the rotor shaft extending from the base plate through the axial bores of the top and the bottom ring magnets to the cantilever; and an encoder positioned on the base plate and adjacent to the encoder scale for recording the angular position of the rotor.

17. The apparatus of claim 16, wherein each of the top and the bottom ring magnet assemblies has a diameter of about 4 cm.

18. The apparatus of claim 16, wherein the gap between the top ring magnet assembly and the bottom ring magnet assembly is about 13 mm.

19. The apparatus of claim 16, wherein the top and the bottom yokes are made from a ferromagnetic material selected from the group comprising cobalt, iron, nickel, gadolinium, dysprosium, terbium, chromium oxide, europium oxide, a manganese/bismuth combination, a manganese/antimony combination, and a manganese/arsenic combination.

20. An apparatus for electronic torque realization of a torque tool, said apparatus comprising:
 a rotor for coupling to the torque tool, wherein the rotor comprises:
  a top ring magnet assembly comprising a first ring magnet and a second ring magnet, wherein each of the first and the second ring magnets comprises a plurality of quarter-ring permanent magnets coupled to form the first and the second ring magnets, wherein alternate quarter-ring permanent magnets of the plurality of the quarter-ring permanent magnets coupled to form each of the first and the second ring magnets are positioned upside-down, wherein the first ring magnet is coupled to the second ring magnet along a plane perpendicular to axes of the first and the second ring magnets, wherein the first ring magnet coupled to the second ring magnet is oriented to position the at least one upside-down quarter-ring permanent magnet of the plurality of quarter-ring permanent magnets of the first ring magnet above an unturned quarter-ring permanent magnet of the second ring magnet, wherein the first and the second ring magnets are oriented with a polarization in the axial direction;
  a bottom ring magnet assembly comprising a third ring magnet and a fourth ring magnet, wherein each of the third and the fourth ring magnets comprises a plurality of quarter-ring permanent magnets coupled to form the third and the fourth ring magnets, wherein alternate quarter-ring permanent magnets of the plurality of the quarter-ring permanent magnets coupled to form each of the third and the fourth ring magnets are positioned upside-down, wherein the third ring magnet is coupled to the fourth ring magnet along a plane perpendicular to axes of the third and the fourth ring magnets, wherein the third ring magnet coupled to the fourth ring magnet is oriented to position the at least one upside-down quarter-ring permanent magnet of the plurality of quarter-ring permanent magnets of the third ring magnet above an unturned quarter-ring permanent magnet of the fourth ring magnet, wherein the third and the fourth ring magnets are oriented with a polarization in the axial direction, wherein the bottom ring magnet assembly is positioned below the top ring magnet assembly and spaced apart from the top ring magnet by a gap;
  a rotor shaft extending through axial bores of the top and the bottom ring magnet assemblies, wherein the rotor shaft is mounted for rotational movement with the top and the bottom ring magnet assemblies;
  a top rotor flange extending radially from the rotor shaft for receiving the top ring magnet assembly, wherein a circumferential edge of the top rotor flange receives the axial bore of the top ring magnet assembly;
  a bottom rotor flange extending from the rotor shaft for receiving the bottom ring magnet assembly, wherein a circumferential edge of the bottom rotor flange receives the axial bore of the bottom ring magnet assembly, wherein the top rotor flange and the bottom rotor flange are positioned on the rotor shaft to provide the gap between the top and the bottom ring magnet assemblies;
  a top yoke fastened to the top rotor flange, wherein the top yoke comprises an axial bore for receiving the rotor shaft, wherein the top yoke extends radially from the rotor shaft to a circumferential edge of the top ring magnet assembly to form a first mounting surface, wherein the top ring magnet is mounted on the first mounting surface formed by the top yoke, wherein rotating the rotor shaft rotates the top yoke fastened to the top rotor flange;
  a bottom yoke fastened to the bottom rotor flange, wherein the bottom yoke comprises an axial bore for receiving the rotor shaft, wherein the bottom yoke extends radially from the rotor shaft to a circumferential edge of the bottom ring magnet assembly to form a second mounting surface, wherein the bottom ring magnet is mounted on the second mounting surface formed by the bottom yoke, wherein rotating the rotor shaft rotates the bottom yoke fastened to the bottom rotor flange;
  an encoder scale ring mounted on the rotor shaft, wherein the encoder scale provides a reference scale for determining an angular position of the rotor;
 a stator comprising a plurality of segments of coils fabricated on each side of each of a plurality of printed circuit boards, wherein the plurality of segments of coils is arranged to form a circular shape, wherein the stator is positioned in the gap between the top and the bottom ring magnet assemblies, wherein at least a portion of the plurality of segments of coils is overlapped by at least a portion of each of the top and the bottom ring magnet assemblies, wherein the stator generates a first magnetic field that interacts with a second magnetic field of the top and the bottom ring magnet assemblies, wherein the interaction of the first magnetic field generated by the stator with the second magnetic field of the top and the bottom ring magnet assemblies generates a torque on the rotor shaft;
 a base plate for mounting a first end of the rotor shaft and the stator;
 a cantilever for mounting a second end of the rotor shaft;
 a bearing assembly positioned on the rotor shaft to provide axial alignment to the rotor shaft extending from the base plate through the axial bores of the top and the bottom ring magnets to the cantilever; and an encoder positioned on the base plate and adjacent to the encoder scale for recording the angular position of the rotor.

* * * * *